(12) United States Patent
Sala et al.

(10) Patent No.: US 11,593,727 B2
(45) Date of Patent: Feb. 28, 2023

(54) USER INTERACTION

(71) Applicant: Nokia Technologies Oy, Espoo (FI)

(72) Inventors: Alessandra Sala, Dublin (IE); Alice Marascu, Dublin (IE); Harri Lindholm, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 79 days.

(21) Appl. No.: 17/020,030

(22) Filed: Sep. 14, 2020

(65) Prior Publication Data

US 2021/0089996 A1 Mar. 25, 2021

(30) Foreign Application Priority Data

Sep. 19, 2019 (EP) .................................... 19198446

(51) Int. Cl.
*G06Q 10/06* (2012.01)
*G06Q 10/04* (2012.01)
(Continued)

(52) U.S. Cl.
CPC ..... *G06Q 10/063114* (2013.01); *G06Q 10/04* (2013.01); *G06Q 10/06375* (2013.01); *G06Q 10/06393* (2013.01); *G06Q 10/06398* (2013.01)

(58) Field of Classification Search
None
See application file for complete search history.

(56) References Cited

U.S. PATENT DOCUMENTS

| | | | |
|---|---|---|---|
| 9,022,931 B2 * | 5/2015 | Brauer | A61B 5/14865 600/301 |
| 9,189,596 B2 | 11/2015 | Chen et al. | |

(Continued)

FOREIGN PATENT DOCUMENTS

| | | | |
|---|---|---|---|
| CN | 103530505 A | | 1/2014 |
| CN | 207053531 U | * | 2/2018 |

(Continued)

OTHER PUBLICATIONS

Ha, Minjeong, Seongdong Lim, and Hyunhyub Ko. "Wearable and flexible sensors for user-interactive health-monitoring devices." Journal of Materials Chemistry B 6.24 (2018): 4043-4064. (Year: 2018).*

(Continued)

*Primary Examiner* — Thomas L Mansfield
(74) *Attorney, Agent, or Firm* — Alston & Bird LLP

(57) ABSTRACT

An apparatus, method and computer program is described comprising: receiving interaction information via at least one user device, wherein the interaction information is related to at least one user using at least one user device in relation to a first content creation task; receiving sensor data relating to the at least one user from one or more sensors; and determining data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data in relation to the first content creation task.

19 Claims, 16 Drawing Sheets

(51) Int. Cl.
*G06Q 10/0631* (2023.01)
*G06Q 10/0637* (2023.01)
*G06Q 10/0639* (2023.01)

(56) References Cited

U.S. PATENT DOCUMENTS

| | | | |
|---|---|---|---|
| 9,737,255 B2 | 8/2017 | Chen et al. | |
| 2015/0179079 A1* | 6/2015 | Rodriguez, Jr. | A61B 5/1104 434/236 |
| 2015/0186612 A1 | 7/2015 | Gartseev et al. | |
| 2015/0278431 A1* | 10/2015 | Hyde | G16H 20/60 707/738 |
| 2015/0279175 A1* | 10/2015 | Hyde | G06Q 10/087 340/815.4 |
| 2015/0279176 A1* | 10/2015 | Hyde | G06Q 10/06 340/815.4 |
| 2015/0279177 A1* | 10/2015 | Hyde | G16H 20/60 340/815.4 |
| 2016/0262680 A1 | 9/2016 | Martucci et al. | |
| 2017/0053007 A1 | 2/2017 | Marascu et al. | |
| 2017/0315825 A1 | 11/2017 | Gordon et al. | |
| 2018/0308569 A1* | 10/2018 | Luellen | G16H 20/10 |
| 2019/0122036 A1 | 4/2019 | Ward et al. | |
| 2019/0146214 A1 | 5/2019 | Lampkin et al. | |

FOREIGN PATENT DOCUMENTS

| | | | | |
|---|---|---|---|---|
| JP | 6010719 B1 * | 10/2016 | | G06F 17/273 |
| WO | WO-2019065688 A1 * | 4/2019 | | G06Q 30/02 |

OTHER PUBLICATIONS

Kim, Jonghun, et al. "Ontology driven interactive healthcare with wearable sensors." Multimedia Tools and Applications 71.2 (2014): 827-841. (Year: 2014).*
Zagermann et al., "Measuring Cognitive Load Using Eye Tracking Technology in Visual Computing", Proceedings of the Sixth Workshop on Beyond Time and Errors on Novel Evaluation Methods for Visualization, Oct. 2016, 8 pages.
Kiekel et al., "Automating Measurement of Team Cognition Through Analysis of Communication Data", Usability evaluation and interface design, 2001, 5 pages.
Lau, "Stress Detection for Keystroke Dynamics", Thesis, May 2018, 232 pages.
Sulem et al., "EMOTHAW: A Novel Database for Emotional State Recognition From Handwriting and Drawing", IEEE Transactions on Human-Machine Systems, vol. 47, No. 2, Apr. 2017, pp. 273-284.
Roth et al., "Biometric Authentication via Keystroke Sound", International Conference on Biometrics (ICB), Jun. 4-7, 2013, 8 pages.
Roth et al., "On Continuous User Authentication Via Typing Behaviour", IEEE Transaction on Image Processing, vol. 23, No. 10, 2014, pp. 1-14.
Roth et al., "Investigating the Discriminative Power of Keystroke Sound", IEEE Transactions on Information Forensics and Security, vol. 10, No. 2, Feb. 2015, pp. 333-345.
Nummenmaaa et al., "Map of Subjective Feelings", Proceedings of the National Academy of Sciences, vol. 115, No. 37, Aug. 2018, pp. 1-6.
Lim et al., "Detecting Emotional Stress During Typing Task with Time Pressure", Science and Information Conference, Aug. 27-29, 2014, pp. 329-338.
Grigsby, "Artificial Intelligence for Advanced Human-Machine Symbiosis", Augmented Cognition: Intelligent Technologies, 2018, pp. 255-266.
Nummenmaa et al., "Supplementary File", PNAS, Sep. 2018, 11 pages.
"Maps of Subjective Feelings", Nummenmaa Lab, Retrieved on Sep. 7, 2020, Webpage available at: https://emotion.utu.fi/maps-of-subjective-feelings/.
Lapata et al., "Automatic Evaluation of Text Coherence: Models and Representations", Proceedings of the Nineteenth International Joint Conference on Artificial Intelligence, Jan. 2005, 6 pages.
"Cognitive Load", Wikipedia, Retrieved on Sep. 7, 2020, Webpage available at: https://en.wikipedia.org/wiki/Cognitive_load#Measurement.
Kargar et al., "Posture and Discomfort Assessment in Computer Users While Using Touch Screen Device as Compared with Mouse-Keyboard and Touch Pad-Keyboard", Work, vol. 59, No. 3, 2018, pp. 341-349.
"Keystroke Dynamics", Wikipedia, Retrieved on Sep. 7, 2020, Webpage available at: https://en.wikipedia.org/wiki/Keystroke_dynamics.
"Keystroke Logging", Wikipedia, Retrieved on Sep. 7, 2020, Webpage available at: https://en.wikipedia.org/wiki/Keystroke_logging#Software-based_keyloggers.
Sciarini, "Noninvasive Physiological Measures and Workload Transitions: An Investigation of Thresholds using Multiple Synchronized Sensors", Dissertation, 2007, 167 pages.
"Meeting on Foundations of Augmented Cognition", Eric Horvitz, Retrieved on Sep. 7, 2020, Webpage available at: http://erichorvitz.com/acog.htm.
Extended European Search Report received for corresponding European Patent Application No. 19198446.7, dated Mar. 31, 2020, 9 pages.

* cited by examiner

USER INTERACTION

FIELD

The present specification relates to user interaction with one or more devices, for example, for creating content.

BACKGROUND

One or more users may interact in different ways with one or more devices for one or more tasks. There remains a need for further improvements in this field.

SUMMARY

In a first aspect, this specification provides an apparatus comprising means for receiving interaction information via at least one user device, wherein the interaction information is related to at least one user using the at least one user device in relation to a first content creation task; means for receiving sensor data relating to the at least one user from one or more sensors;

and means for determining data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

Some example embodiments include means for processing at least some of said determined data.

In some example embodiments, the means for processing said determined data comprises monitoring at least some of said determined data.

In some example embodiments, monitoring at least some of said determined data comprises comparing at least one of the content creation performance data and user state data of the at least one user with at least one of the content creation performance data and user state data of at least one other user.

In some example embodiments, monitoring at least some of said determined data comprises comparing at least one of the content creation performance data and user state data of the at least one user at a first time instance with at least one of the content creation performance data and user state data of the at least one user at a second time instance.

In some example embodiments, the means for processing said determined data comprises means for causing a change to one or more factors related to the first content creation task based, at least in part, on at least some of said determined data.

In some example embodiments, the means for processing said determined data comprises means for: adding one or more additional parts of one or more content creation tasks assigned to the at least one user; and/or removing one or more parts of one or more content creation tasks assigned to the at least one user.

In some example embodiments, said determined data further comprises historical performance data, wherein the historical performance data is based, at least in part on, one or more of historical content creation performance data, or corresponding historical user state data. The historical performance data may, for example, comprise simulation data, wherein the simulation data is obtained by inducing one or more triggers to the at least one user. Some example embodiments include means for determining a first score related to the user state data and a second score related to the historical user state data; and means for performing one or more user state tests if a difference between the first score and the second score is higher than a first threshold.

In some example embodiments, the content creation performance data is determined based on information relating to one or more of mechanical interaction of the at least one user with the at least one user device, quality of one or more parts of the first content, or syntactic proficiency of one or more parts of the first content when the at least one user performs the first content creation task.

In some example embodiments, the user state data is based, at least in part, on one or more of subjective data, physiological data, psychological data, biomechanical data, or morphological data.

Some examples include means for training the first model.

The means may comprise: at least one processor; and at least one memory including computer program code, the at least one memory and the computer program code configured, with the at least one processor, to cause the performance of the apparatus.

In a second aspect, this specification describes a method comprising: receiving interaction information via at least one user device, wherein the interaction information is related to at least one user using at least one user device in relation to a first content creation task; receiving sensor data relating to the at least one user from one or more sensors; and determining data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

Some example embodiments may further comprise processing at least some of said determined data.

Processing said determined data may comprise monitoring at least some of said determined data.

In some example embodiments, monitoring at least some of said determined data comprises comparing at least one of the content creation performance data and user state data of the at least one user with at least one of the content creation performance data and user state data of at least one other user.

In some example embodiments, monitoring at least some of said determined data comprises comparing at least one of the content creation performance data and user state data of the at least one user at a first time instance with at least one of the content creation performance data and user state data of the at least one user at a second time instance.

In some example embodiments, processing said determined data comprises causing a change to one or more factors related to the first content creation task based, at least in part, on at least some of said determined data.

In some example embodiments processing said determined data comprises adding one or more additional parts of one or more content creation tasks assigned to the at least one user and/or removing one or more parts of one or more content creation tasks assigned to the at least one user.

In some example embodiments, said determined data further comprises historical performance data, wherein the historical performance data is based, at least in part on, one or more of historical content creation performance data, or corresponding historical user state data. The historical performance data may comprise simulation data, wherein the simulation data is obtained by inducing one or more triggers to the at least one user. Some example embodiments may further comprise determining a first score related to the user state data and a second score related to the historical user state data; and performing one or more user state tests if a difference between the first score and the second score is higher than a first threshold.

In some examples, the content creation performance data is determined based on information relating to one or more of mechanical interaction of the at least one user with the at least one user device, quality of one or more parts of the first content, or syntactic proficiency of one or more parts of the first content when the at least one user performs the first content creation task.

In some examples, the user state data is based, at least in part, on one or more of subjective data, physiological data, psychological data, biomechanical data, or morphological data.

Some examples may further comprise training the first model.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receiving interaction information via at least one user device, wherein the interaction information is related to at least one user using at least one user device in relation to a first content creation task; receiving sensor data relating to the at least one user from one or more sensors; determining data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

In a sixth aspect, this specification describes a computer-readable medium (such as a non-transitory computer-readable medium) comprising program instructions stored thereon for performing at least the following: receiving interaction information via at least one user device, wherein the interaction information is related to at least one user using at least one user device in relation to a first content creation task; receiving sensor data relating to the at least one user from one or more sensors; determining data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

In a seventh aspect, this specification describes an apparatus comprising: at least one processor; and at least one memory including computer program code which, when executed by the at least one processor, causes the apparatus to: receive interaction information via at least one user device, wherein the interaction information is related to at least one user using at least one user device in relation to a first content creation task; receive sensor data relating to the at least one user from one or more sensors; and determine data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

In an eighth aspect, this specification describes an apparatus comprising: a first input module configured to receive interaction information via at least one user device, wherein the interaction information is related to at least one user using at least one user device in relation to a first content creation task; a second input module configured to receive sensor data relating to the at least one user from one or more sensors; and a control module to determine data, using a first model, the data comprising content creation performance data and user state data, wherein: the content creation performance data indicates performance of the at least one user in relation to the first content creation task, based, at least in part, on the interaction information and a first content created when the at least one user performs the first content creation task; and the user state data is based, at least in part, on the received sensor data relating to the at least one user in relation to the first content creation task.

BRIEF DESCRIPTION OF THE DRAWINGS

Example embodiments will now be described, by way of non-limiting examples, with reference to the following schematic drawings, in which.

DETAILED DESCRIPTION

Figure 1:
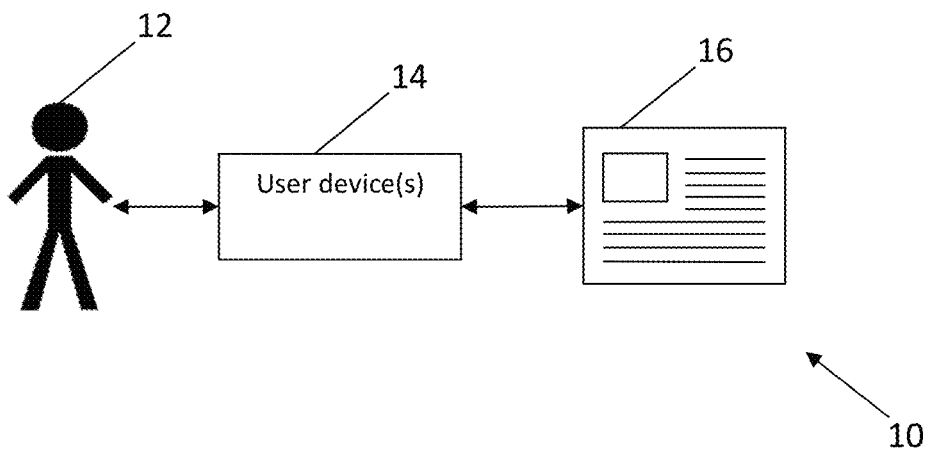
FIG. 1 is a block diagram of an example system.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Users may use one or more user devices, such as computers, phones, tablets, or the like, for performing various tasks. When using such user devices, the user may interact with the devices, for example, using a keyboard, a mouse, a keypad, or any other user interfaces. FIG. 1 is a block diagram of an example system, indicated generally by the reference numeral 10. The system 10 comprises a first user 12, one or more user devices 14, and a first content 16. The first user 12 may use the one or more user devices 14 in order to create one or more contents, such as the first content 16. The first content 16 may comprise text, figures, drawings, videos, audio, or any other content that may be created using the one or more user devices 14.

When the user 12 uses the one or more user devices 14 for creating one or more contents 16, the user 12 interacts with the one or more user devices 14. For example, the user 12 may interact with a computer by typing on a keyboard of the computer, by moving a mouse, and/or by typing on (or otherwise interacting with) a touch screen. The user 12 may also interact with the computer by navigating through one or more user interfaces. As such, the interaction of the user 12 with the one or more user devices 14 may be used in at least some example embodiments.

Figure 2:
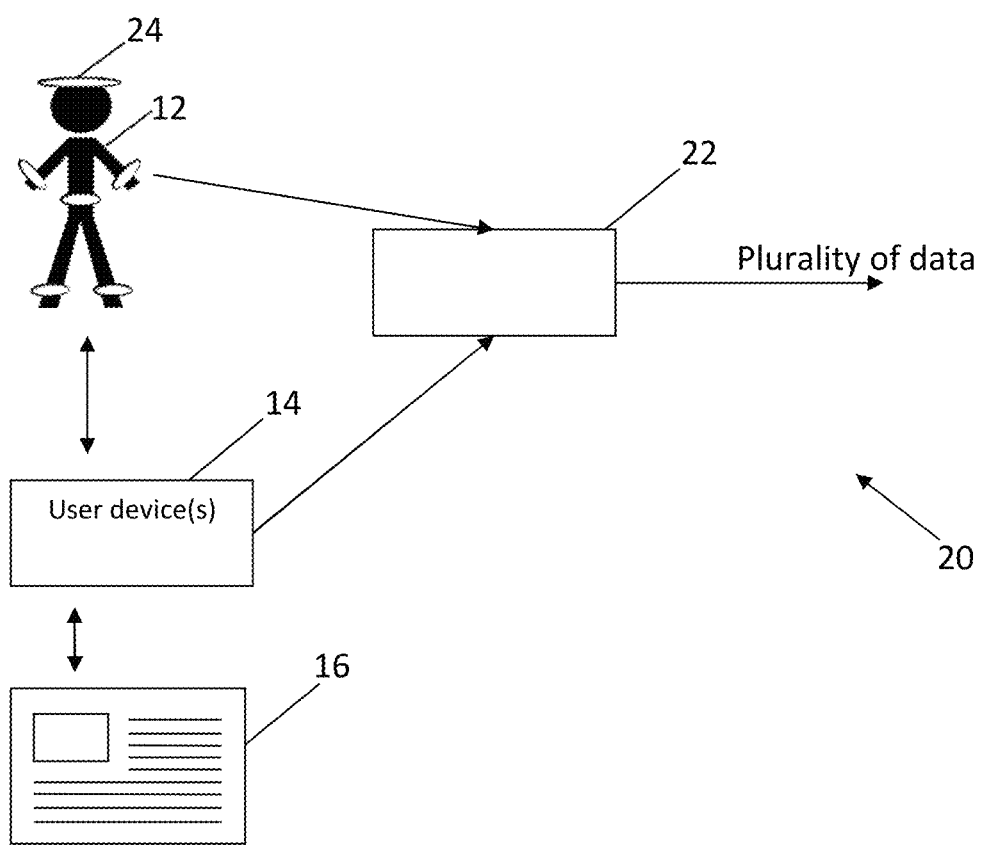
FIG. 2 is a block diagram of a system in accordance with an example embodiment.

FIG. 2 is a block diagram of a system, indicated generally by the reference numeral 20, in accordance with an example embodiment. The system 20 comprises the user 12, one or more sensors 24, one or more user devices 14, a first content 16 being created and a processing module 22. For example, the sensors 24 may be comprised in one or more wearable devices worn by the user 12, or may be comprised in another device relating to the user 12. The user 12 may use the one or more user devices 14 in relation to a first content creation task. The first content creation task may relate to creating content or manipulating or changing content. For example, the first content creation task may be to create a first content, such as the first content 16. FIG. 2 is viewed in conjunction with FIG. 3 for better understanding of the example embodiments.

Figure 3:
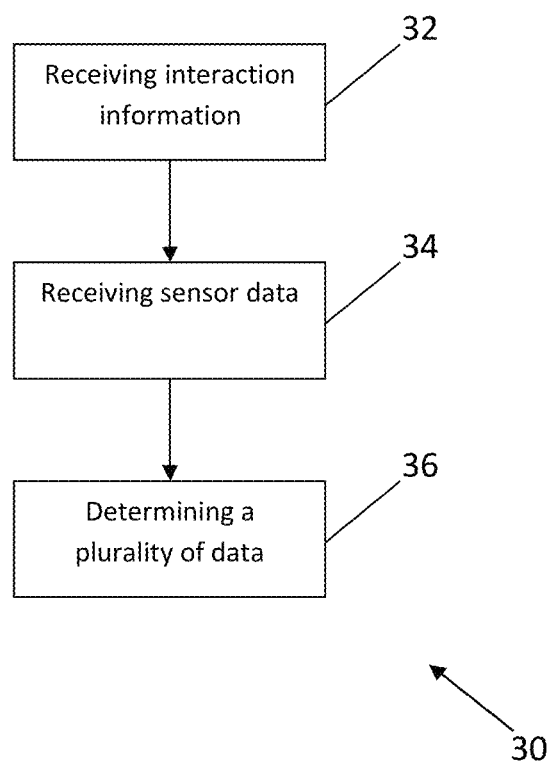
FIG. 3 is a flow chart of an algorithm in accordance with an example embodiment.

FIG. 3 is a flowchart of an algorithm, indicated generally by the reference numeral 30, in accordance with an example embodiment. At operation 32, interaction information is received via at least one user device, such as the user device 14. For example, the interaction information may be received at the processing module 22. The interaction information may be related to the user 12 using the user device 14 in relation to the first content creation task. At operation 34, sensor data relating to the user 12 may be received from the one or more sensors 24 (e.g. receiving sensory data while monitoring a task or operation performed by the user). At operation 36, a plurality of data (e.g. including data analytics, data patterns, data evolution patterns, etc.) may be determined at the processing module 22, based at least partially on the interaction information and the sensor data. The plurality of data may be determined using a first model.

For example, the interaction information may be determined at the one or more user devices 14. As such, the interaction information may be received from the one or more user devices 14. Alternatively, or in addition, the interaction information may be received from one or more intermediary devices (e.g. sensors) that may collect information related to the interaction of the user 12 with the one or more user devices 14. In one example, when the user 12 uses a keyboard to interact with the user device 14 (e.g. a laptop or desktop computer), keylogging (keyboard capturing) may be performed in order to record or log details (including pressure applied while pressing a key, time stamp of pressing a key, typing pattern, etc.) of any typing action performed by the user in relation to the first content creation task. Keylogging may be performed for each item (e.g. each typed letter) of the first content. Keylogging may be performed using hardware or software at the keyboard or the user device 14.

Figure 15:
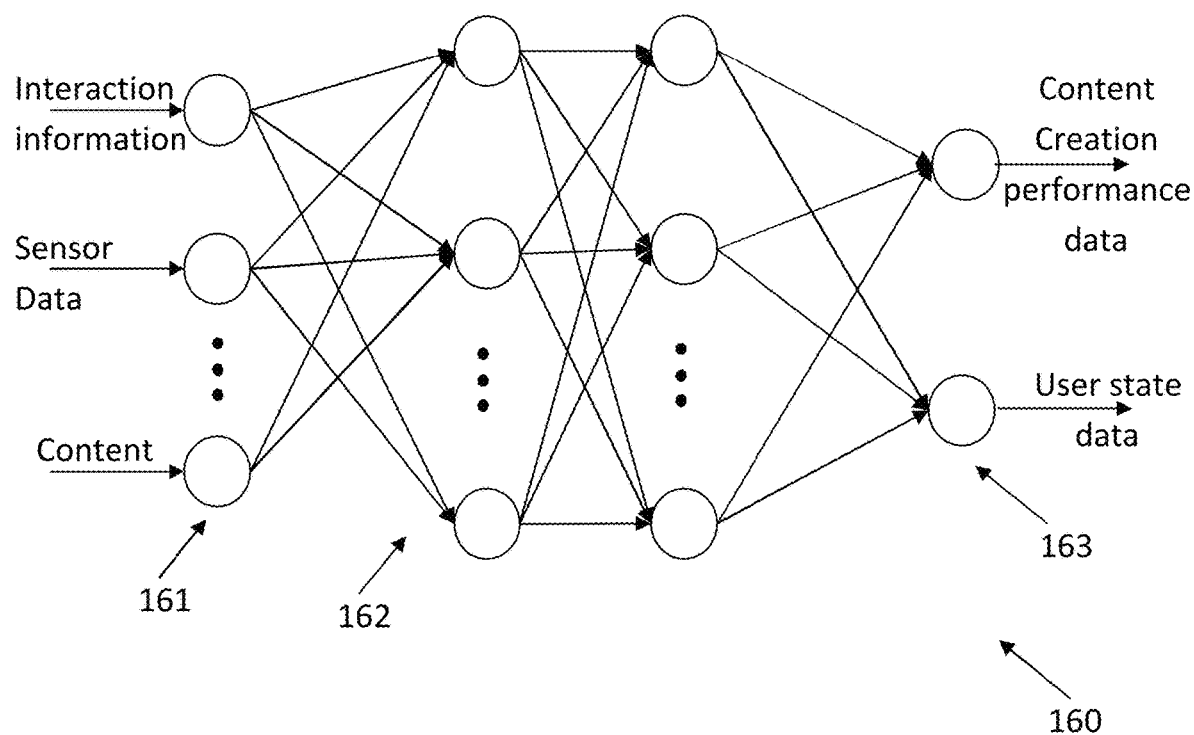
FIG. 15 shows a first model in accordance with an example embodiment.

In an example embodiment, the sensor data received at operation 34 may comprise one or more of subjective data (e.g. self-reported data), physiological data, psychological data, biomechanical data, or morphological data, which is described in further detail in FIG. 15. The received sensor data may be used for deriving information regarding symptomatic state of the user. Symptomatic states may include one or more of the states of feeling happy, sad, fearful, angry, surprised, physical pain, cold, hot, positivity, relaxation, engagement, dizziness, extraversion, awakeness, socialness, fitness, empathy, or any other state that a user may feel.

In an example embodiment, the subjective data may be entered by a user (e g manually reported by a user), such that the subjective data may comprise data that may not be received directly from a sensor. The morphological data may be related to a form, shape or structure of devices used by a user for performing one or more tasks, such that the morphological data may also comprise data that may not be received directly from a sensor. However, for the purposes of this specification, the term "sensor data" may refer to one or more of the subjective data (e.g. self-reported data), physiological data, psychological data, biomechanical data, or morphological data.

In an example embodiment, the plurality of data may comprise at least one of content creation performance data and user state data. The content creation performance data may indicate performance of the user 12 in relation to the first content creation task. For example, the content creation performance data may be based at least partially on the interaction information and a first content 16 created when the user 12 performs the first content creation task. The user state data may be based, at least in part on the received sensor data relating to the user 12. In an example embodiment, the user state data and the content creation performance data may be utilized for determining a cognitive state of the user 12. The cognitive state of the user 12 may provide an indication of how well (e.g. efficiency and/or quality of the performance), the user 12 performs (e.g. has been performing, or is likely to perform in the future) a content creation task. The user state data and content creation performance data may further be used as historical performance data for training one or more models (e.g. simulation models for determining cognitive state of one or more users).

Figure 4:
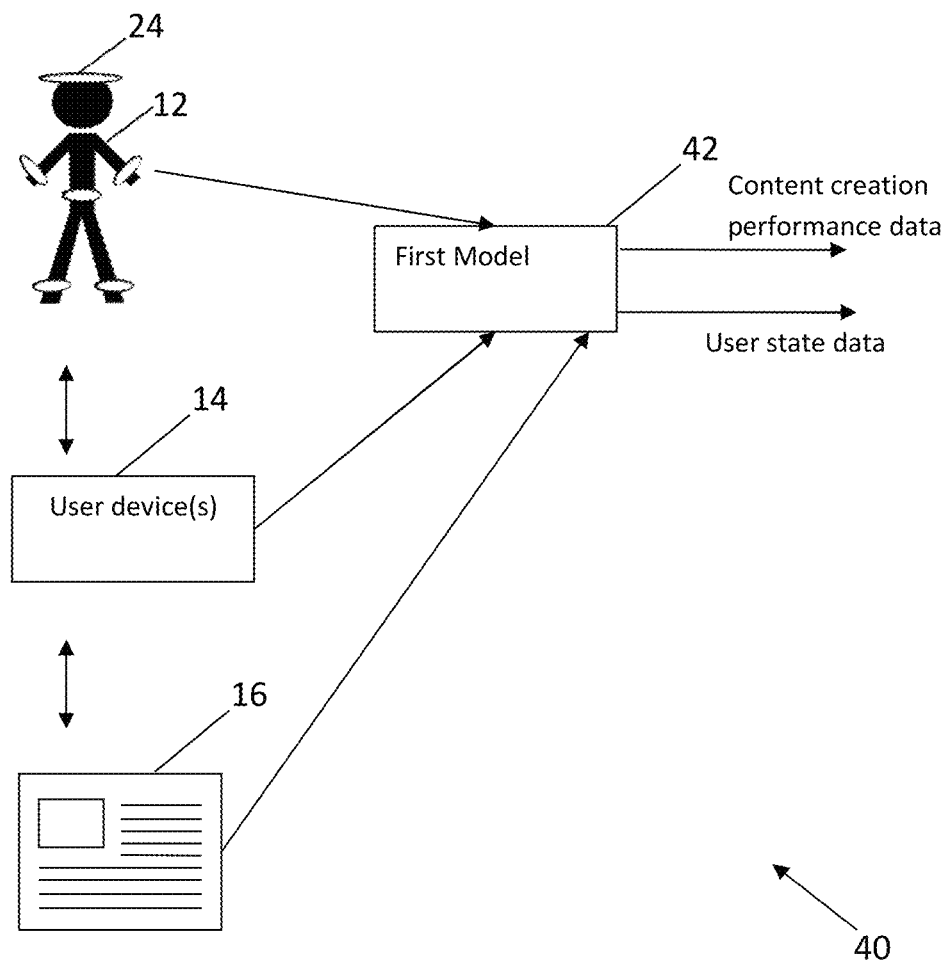
FIG. 4 is a block diagram of a system in accordance with an example embodiment.

FIG. 4 is a block diagram of a system, indicated generally by the reference numeral 40, in accordance with an example embodiment. System 40 comprises the user 12, the one or more user devices 14 and the first content 16. System 40 further comprises a first model 42. The first model 42 may be used for determining a plurality of data, including content creation performance data and user state data.

In an example embodiment, the first model 42 may use one or more machine learning and/or data mining models. In one example, the first model 42 may use data relating to mechanical interaction of the user 12 with the one or more user devices 14, quality of one or more parts of the content 16, and syntactic proficiency of one or more parts of the first content 16 when the user 12 performs the first content creation task.

In an example embodiment, the first model 42 may receive, as inputs, sensor data relating to one or more users (such as the user 12), interaction information from one or more user devices 14, and information relating to the created first content 16. For example, the first model 42 may receive data over a period of time, such that a set of streaming data is received relating to the sensor data, interaction information and content 16 while the user 12 is using user devices 14 in relation to the first content creation task for creating the first content 16. The first model 42 provides, as an output, a plurality of data comprising content creation performance data and user state data.

When a user performs a task, such as a content creation task, the user's performance may be affected by various factors relating to the user state. For example, the user's physical or psychological state may affect efficiency of creating the content and/or quality of the content. The way the user interacts with one or more user devices for creating the content may also be affected by the user's physical or psychological state. In turn, the user's performance and/or user state may be affected if the interaction of the user with the one or more user devices is not optimal for the content creation task. As such, content creation performance, user interaction, and user state may be inter-related with each other. Some of the example embodiments analyse this inter-relation by using one or more machine learning models and further for determining how performance of one or more users for performing one or more tasks may be improved.

In an example embodiment, the content creation performance data and the user state data may be used for determining a workload of a user, such as the user 12. The workload of the user 12 may be determined using a workload model. In an example embodiment, the workload model may comprise a plurality of dimensions including one or more of performance, self-reported or subjective, physiological, psychological, biomechanical, simulation, morphological, and connectional dimensions. The workload model may receive as inputs one or more of the content creation performance data and user state data (as determined at operation 36 using the first model 42). The content creation performance data may be related to the performance dimension of the workload model, and the user state data may be related to the self-reported or subjective dimension, the physiological dimension, the psychological dimension, the biomechanical dimension, and the morphological dimension of the workload model.

In an example embodiment, the first content creation task may contribute to a part of one or more demands on the user 12. A workload of a user may be a measure of demands on the user while the user is performing at least part of one or more tasks. The workload may represent a total number of demands that may be placed on the user in order to finish one or more tasks. The workload may further be a quantitative representation of the nature of the demands on the user. For example, a first user may be performing one part of a task with average difficulty level "low" and a second user may be performing another part of the task with average difficulty level "high". The demands on the second user may then be higher than the demands on the first user due to the difference in difficulty level.

It may be appreciated that a workload may represent number of tasks, nature of tasks, time required to complete a task, and any other information about demands on the user that may be computed using the workload model. Such demands may not be determined simply based on knowledge of what tasks a user may be doing, as different users may handle tasks differently, and the nature of the task itself may not accurately reflect the workload on different users.

Demands on the user 12 may be based on information relating to the one or more parts of one or more tasks assigned to the user 12, and/or information relating to one or more parts of one or more tasks assigned to one or more other users. For example, the first content creation task may be related to preparing a research paper (e.g. including text, drawings, references, etc.). A first part of the first content creation task may be related to the sections requiring administrative work, such as preparing author names and profiles, bibliographic information, table of contents, or the like. A second part of the first content creation task may be related to the sections requiring information on the research topic, experiment results, or the like. As such, the first part may have a lower difficulty level relative to the second part.

In one example, the workload of the user 12 may indicate whether the user 12 is assigned more demands than he/she may be capable of performing, or whether the user 12 is too tired to work efficiently, in which case the demands on the user 12 may be reduced in order to maximize efficiency. Similarly, if the workload of one or more other users may indicate that the one or more other users may be capable of performing more demands than the demands currently assigned to them, some of the demands of the user 12 may be assigned to the one or more other users, and thus the demands may be balanced among the one or more users.

A plurality of users may collaborate in relation to a single content creation task, such that each of the plurality of users may perform one or more different parts of the content creation task. Content creation performance and user state of each user may be affected by the nature (e.g. difficulty level, skills requirement, etc.) of the one or more parts of the content creation task, the amount of demands on each user (e.g. time requirement for completing one or more parts of the content creation task, etc.), the content creation performance and user state of other users in the collaboration, and the collective content creation performance and user state of the collaborative team as a whole. Alternatively, or in addition, a user may be required to perform more than one content creation tasks or more than one parts of a content creation task in a given time period. As such, the user's content creation performance and user state may be affected by the amount of demands on the user. For example, a user may be stressed (as detected by the user state) and/or the content creation performance may be low if the demands on the user is higher relative to a normal amount of demands on the user, or if the user does not have the required skills to perform one or more parts of the one or more content creation tasks.

Figure 5:
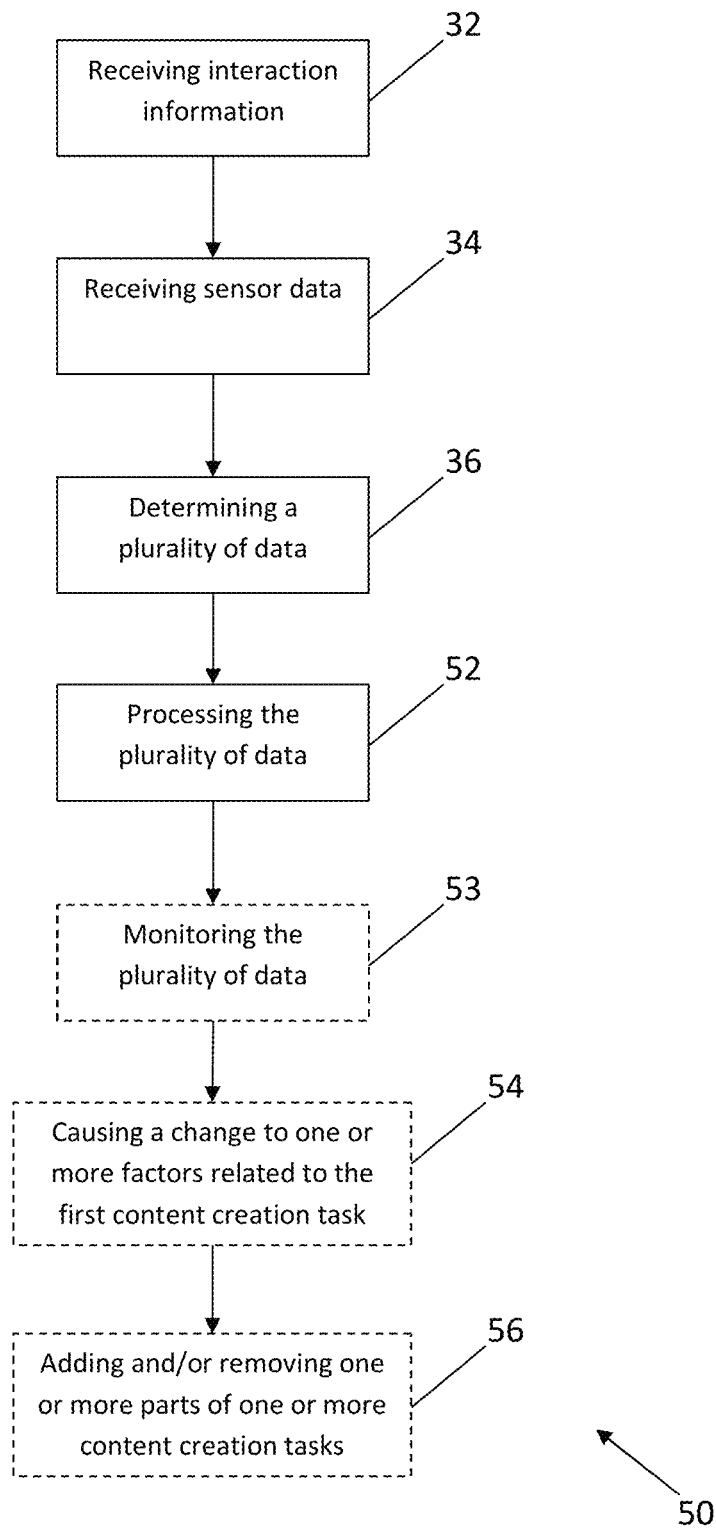
FIG. 5 is a flow chart of an algorithm in accordance with an example embodiment.

FIG. 5 is a flowchart of an algorithm, indicated generally by the reference numeral 50, in accordance with an example embodiment. The algorithm 50 comprises operations 32, 34 and 36, which operations are similar to the operations 32, 34 and 36 of the algorithm 30, as described above with reference to FIG. 3. At operation 52, at least some of the plurality of data (as determined at operation 36) may be processed. As such, the content creation performance data and the user state data may be processed at operation 52.

In an example embodiment, the systems 20 and 40, and the algorithms 30 and 50 may be applicable to a plurality of users, such that the determined plurality of data (including the content creation performance data and user state data) may relate to the plurality of users. Each of the plurality of users may use one or more user devices to perform one or more parts of one or more content creation tasks, and the interaction information and sensor data may relate to each of the plurality of users.

In an example embodiment, processing the plurality of data may comprise determining a quantitative score related to content creation performance data based at least in part, on scores for mechanical interaction of the user with user devices, quality of content, and syntactic proficiency. The processing of the plurality of data may further comprise determining a quantitative score related to user state data based, at least in part, on scores for subjective, physiological, psychological, biomechanical and morphological data.

In an example embodiment, processing the plurality of data may comprise determining a quantitative score for historical performance data (e.g. based on historical content creation performance data and historical user state data) based, at least in part, on scores for at least one of simulation data, and pattern evolution (e.g. patterns analysed from past behaviour of the user).

In an example embodiment, processing the plurality of data comprises monitoring at least some of the plurality of data at operation 53. The content creation performance data may be monitored over a first time period. For example, the monitoring may be performed at a processor, such as processing module 22. Alternatively, or in addition, the monitoring may be performed at a remote system (e.g. a cloud server, a central supervisory system, or the like). For example, the monitoring of the content creation performance data and user state data may comprise comparing content creation performance and/or user state of a first user (such as the user 12) with content creation performance and/or user state of one or more other users. The first user may be performing one or more parts of one or more content creation tasks, and the one or more other users may be performing one or more other parts of one or more tasks. Alternatively, or in addition, the monitoring the content creation performance and/or user state may comprise comparing content creation performance and/or user state of the first user at different time instances of the first time period. For example, the monitoring may comprise comparing content creation performance and/or user state of the first user at a first time instance of the first time period with content creation performance and/or user state of the first user at a second time instance of the first time period or another time period. Alternatively, or in addition, the monitoring may comprise analysing one or more patterns of evolution of content creation performance and/or user state of the first user and/or one or more other users over the first time period. For example, the analysing may comprise analysing historical data and present data relating to content creation performance and/or user state of the first user performing one or more types of content creation tasks historically or at present. This may provide information on whether the first user is improving at performing certain tasks as the first user gets more experience at the task. For example, if the first user has been doing similar tasks for a period of one year, the patterns of evolution of content creation performance may be expected to show that the first user has improved in efficiency and performance for the task over the period of one year. In another example, if certain changes are made to one or more factors (e.g. interaction with user devices, type of content, other users collaborating with the first user, etc.), it may be determined whether the changes affect the content creation performance and/or user state of the first user.

In an example embodiment, processing the plurality of data comprises causing a change to one or more factors related to the first content creation task at operation 54, based, at least in part, on at least some of the plurality of data determined at operation 36. The one or more factors may include one or more of the number of demands on the user, the one or more user devices being used by the user for the content creation task, one or more settings of the user devices, time requirements for the content creation task, environmental settings (e.g. temperature, sound, lighting, etc. of the user's surroundings), or cognitive resources provided to the user. For example, the content creation performance data (e.g. mechanical interaction) of the user 12 may indicate that the user 12 is pressing keyboard keys with a relatively high pressure, which may in turn indicate that the user 12 is stressed (e.g. stress level of the user may be higher than a first stress threshold). The content creation performance data may further indicate that the visual activity of the user 12 is different than the normal visual activity of the user 12, which may indicate that the user 12 may be experiencing eye fatigue. In order to improve the performance of the user, a relaxation trigger may be induced to the user 12, such that a stress level of the user 12 may be reduced to be equal to or lower than the first stress threshold (e.g. stress level may be determined based on further received sensor data or content creation performance data as described above), and the lighting of the user's environment may be changed in order to reduce the eye fatigue of the user. Alternatively, or in addition, the time requirement for completing the content creation task may be changed such that the user is less stressed (for example, the user's supervisor may allow extending a deadline for completing the task). In another example, if it is determined that the user may be facing difficulty in using a keyboard or a mouse due to a physical condition of the user (e.g. carpel tunnel), suggestions may be made to provide user devices that are suitable (e.g. ergonomically adjusted) for the user with the physical condition, such that the user's comfort is maximized in order to improve the user's performance.

In an example embodiment, processing the plurality of data comprises, at operation 56, adding one or more additional parts of one or more content creation tasks assigned to the first user, such as user 12, and/or removing one or more parts of one or more content creation tasks assigned to the first user. For example, if the content creation performance data or a workload of the user indicates that the demands on the user are higher than the user is able to handle, one or more parts of one or more tasks assigned to the user may be removed in order to reduce the demands on the user. Alternatively, or in addition, if the content creation performance data or workload of the user indicates that the demands on the user is lower than the user is able to handle (e.g. the user has free time to do other tasks, while other users may be overloaded with tasks), one or more additional parts of one or more content creation tasks may be assigned to the user. Alternatively, or in addition, if the content creation performance data or a workload of the user indicates that the demands on the user is higher than the user is able to handle, one or more parts of one or more tasks (e.g. difficult tasks with high cognitive demand) assigned to the user may be removed, and one or more additional parts of one or more tasks (e.g. simple tasks with low cognitive demand) may be assigned to the user. Similarly, if the content creation performance data or a workload of the user indicates that the demands on the user are lower than the user is able to handle, one or more additional parts of one or more tasks (e.g. difficult tasks with high cognitive demand) may be assigned to the user, and optionally, one or more parts of one or more tasks (e.g. simple tasks with low cognitive demand) assigned to the user may be removed and may be assigned to one or more other users.

Figure 6:
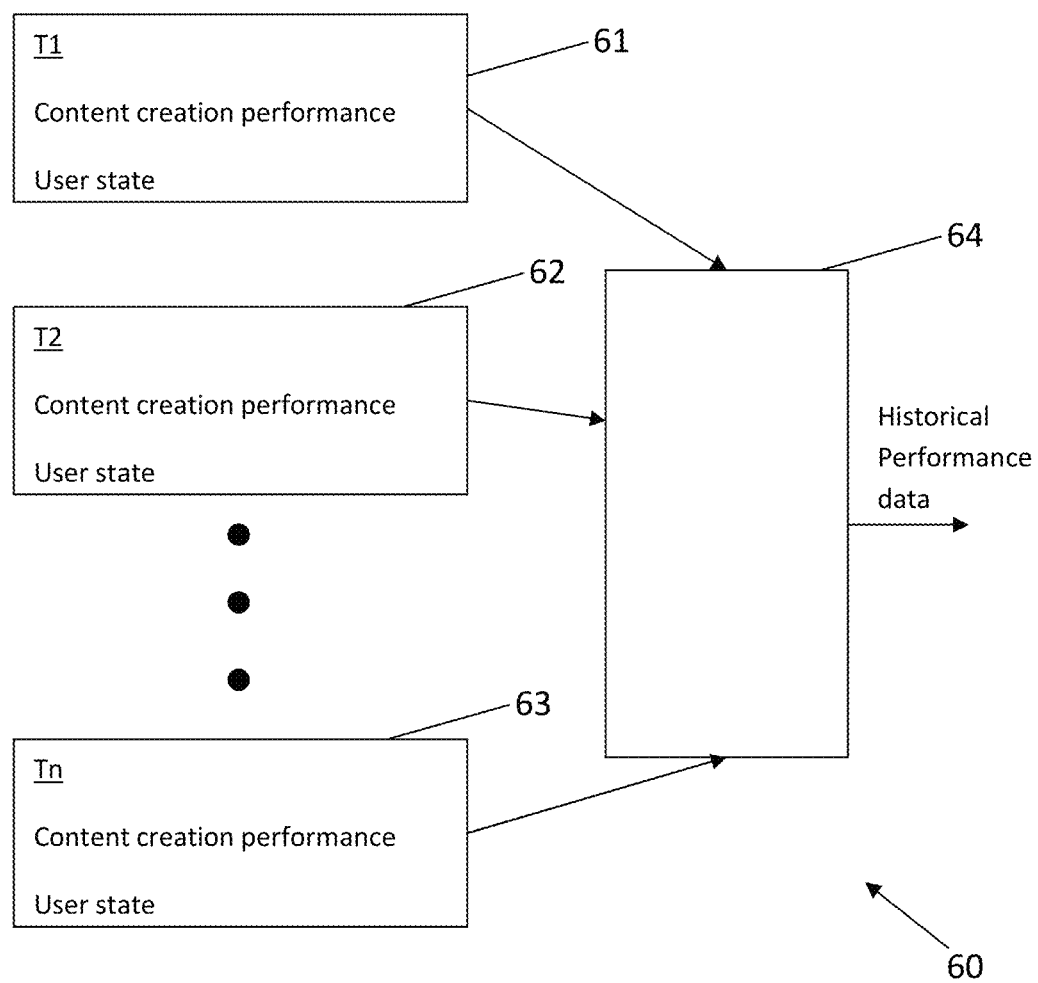
FIGS. 6 to 10 are block diagrams of systems in accordance with example embodiments.

FIG. 6 is a block diagram of a system, indicated generally by a reference numeral 60, in accordance with an example embodiment. System 60 comprises a processing module 64 receiving a plurality of data 61, 62, and 63 corresponding to a plurality of time instances T1, T2, and Tn respectively over a first time period. Content creation performance and user state of a user in relation to one or more content creation tasks may change over the first time period (e.g. starting at T0 and ending at Tn). As such, data 61 represents a first historical content creation performance data and a first historical user state data corresponding to the user performing the first content creation task at time T1; data 62 represents a second historical content creation performance data and a second historical user state data corresponding to the user performing the first content creation task at time T2; and data 63 represents a third historical content creation performance data and a third historical user state data corresponding to the user performing the first content creation task at time Tn. There may be a plurality of data received (not shown) for a plurality of time instances in between T2 and Tn. The plurality of data 61, 62, and 63 may be used by the processing module 64 for determining a historical performance data based on at least one of the first, second, or third historical content creation performance and/or corresponding at least one first, second or third historical user state. The first, second, and third historical content creation performance data may comprise derived analytics based on previous content creation performance of the user.

In an example embodiment, the historical performance data may comprise simulation data, which simulation data may be obtained by inducing one or more triggers to the user. The historical performance data may be related to the simulation dimension of the workload model described above. The simulation data is described in further details with reference to FIGS. 11 and 12.

Figure 7:
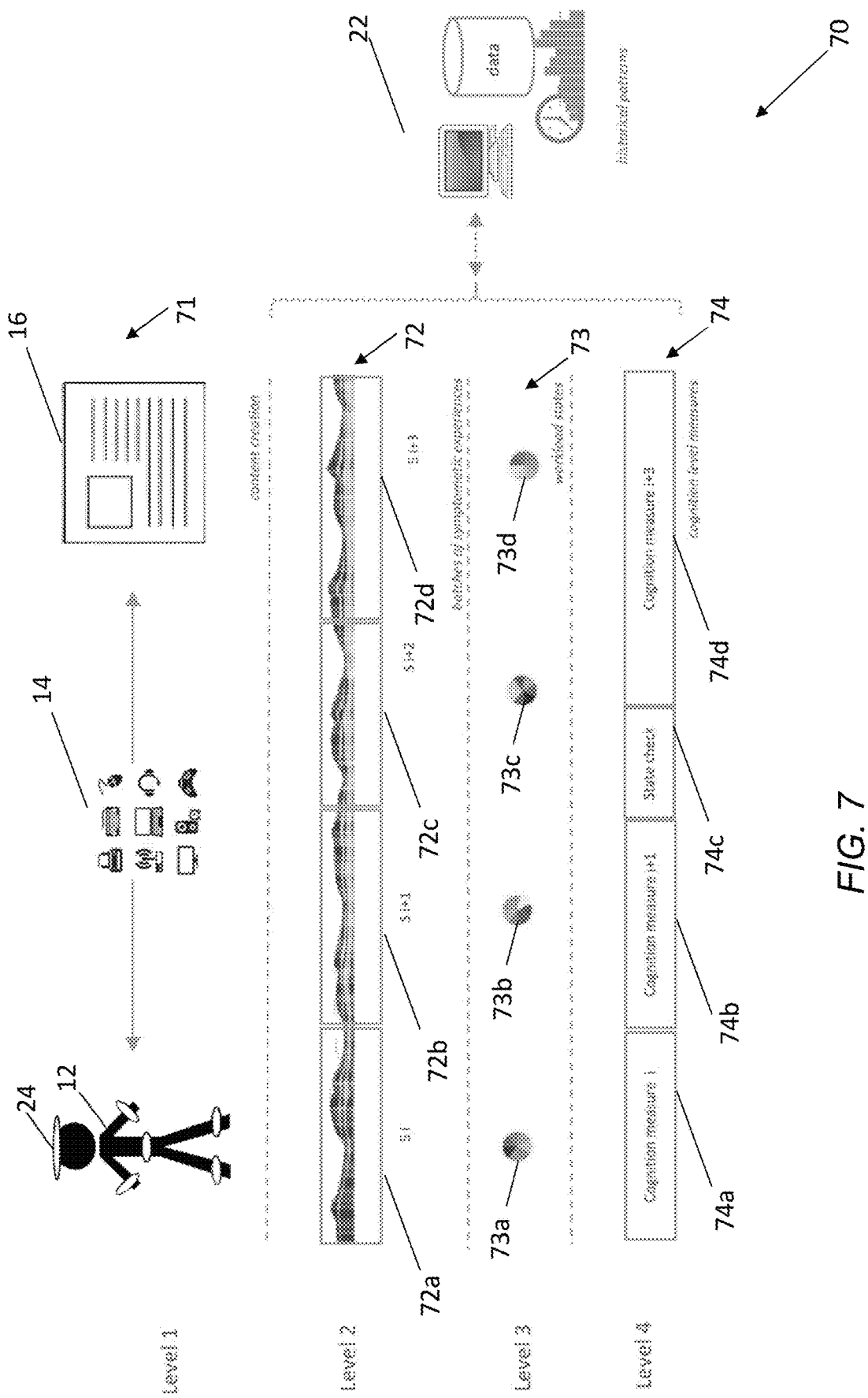

FIG. 7 is a block diagram of a system, indicated generally by the reference numeral 70, in accordance with an example embodiment. System 70 is an illustration of a plurality of levels of processing performed when the user 12 interacts with the one or more user devices 14 in relation to the first content creation task for creating the first content 16. System 70 comprises the user 12, the one or more sensors 24, the user devices 14, the first content 16, and the processing module 22. System 70 further comprises a first processing level 71, a second processing level 72, a third processing level 73 and a fourth processing level 74.

At processing level 71, a continuous time series (e.g. continuous stream of data) of interaction information, sensor data, and information of the content being created, may be received. For example, the continuous time series may be received and/or monitored at a processor, such as processing module 22. Alternatively, or in addition, continuous time series may be received and/or monitored at a remote system (e.g. a cloud server, a central supervisory system, or the like). The streamed data may relate to the user 12 interacting with one or more user devices 14 in relation to one or more parts of a first content creation task in order to create one or more parts of the first content 16. The streamed data may mathematically form an infinite stream.

At the processing level 72, the streamed data may be separated into a plurality of segments, such as segments 72a, 72b, 72c, and 72d. The plurality of segments of data may be processed sequentially. The segmentation of data may be performed at cognitively correct timestamps. For example, the segmentation may be performed based on a symptomatic state of the user (e.g. happy, sad, fearful, angry, surprised, physical pain, cold, hot, positivity, relaxation, engagement, dizziness, extraversion, awakeness, socialness, fitness, empathy, or any other state that a user may feel etc.). Alternatively, or in addition, the segmentation may be performed based on time, physical state, psychological state, or any other criteria defined by the user or a default criteria. As such, in one example, the segment 72a may relate to the user 12 feeling relaxed, segment 72b may relate to the user 12 feeling happy, segment 72c may relate to the user feeling tired, and segment 72d may relate to the user feeling stressed. Alternatively, or in addition, the streamed data may be processed as one segment, such that the segmentation into a plurality of segments may be optional.

At processing level 73, a plurality of data segments 73a, 73b, 73c and 73d are determined for each segment 72a, 72b, 72c, and 72d. The determined plurality of data segments 73a, 73b, 73c, and 73d may comprise at least one of content creation performance data and user state data, as computed from the first model.

At processing level 74, the plurality of determined data may be analysed and processed. The processing of the determined data may comprise monitoring the data at cognition measures 74a, 74b, and 74d. The cognition measures 74a, 74b, and 74d may comprise measurements of a cognitive state of the user 12. The cognitive state of the user 12 may provide an indication of how well (e.g. efficiency and/or quality of the performance), the user 12 performs (e.g. has been performing, or is likely to perform in the future) a content creation task. Alternatively, or in addition, the processing of the determined data may comprise performing one or more user state tests, for example at state check 74c. The user state tests are explained in further detail with reference to FIGS. 13 and 14.

In an example embodiment, the processing corresponding to the processing levels 71, 72, 73, and 74 may be performed at the processing module 22, or may be performed at a remote server or supervisory system.

Figure 8:
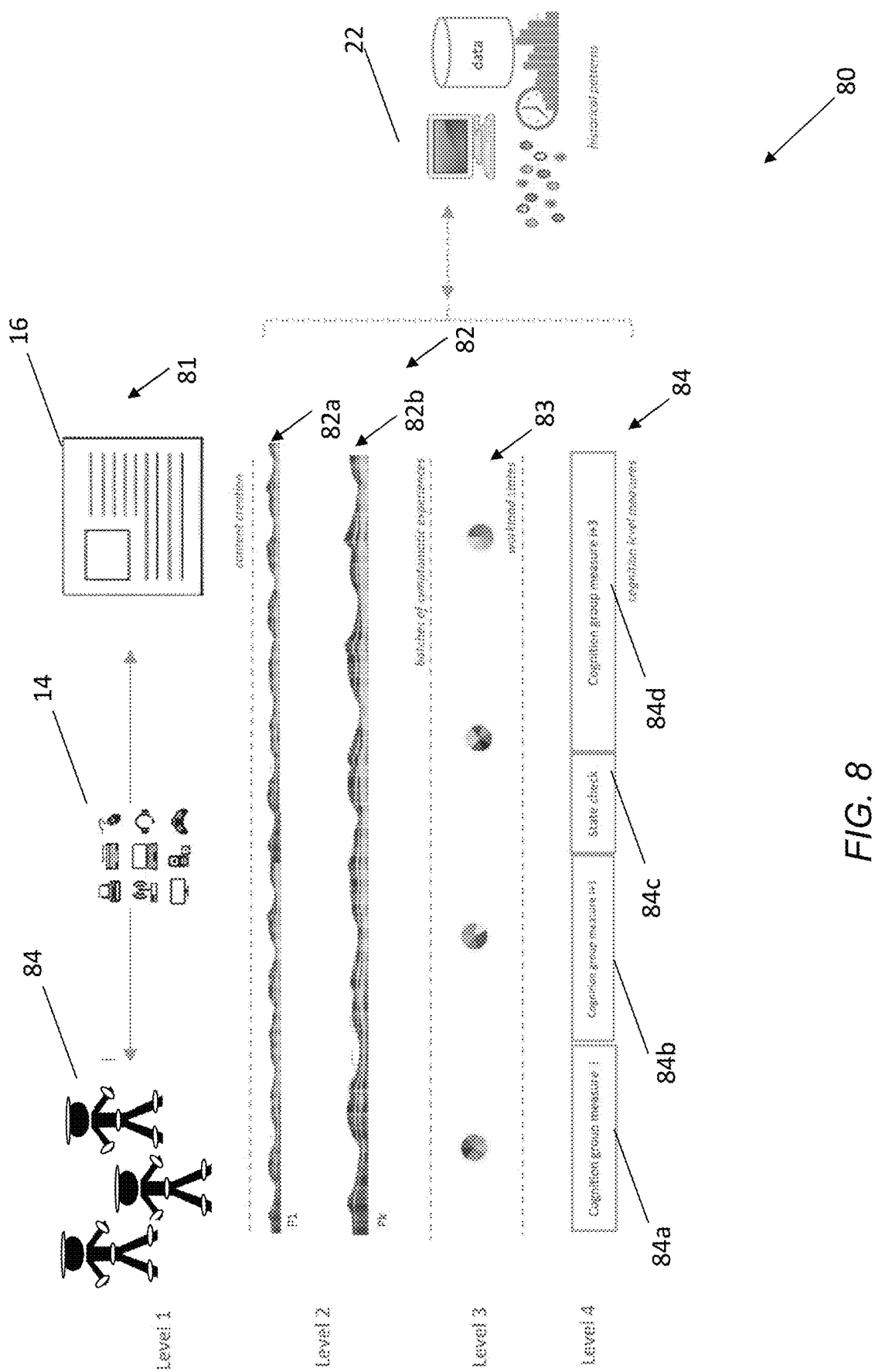

FIG. 8 is a block diagram of a system, indicated generally by the reference numeral 80, in accordance with an example embodiment. System 80 is an illustration of a plurality of levels of processing performed when a plurality of users interact with the one or more user devices 14 in relation to the first content creation task for creating the first content 16. System 80 comprises the plurality of users 84 (e.g. with one or more wearable or non-wearable sensors), the user devices 14, the first content 16, and the processing module 22. System 80 further comprises a first processing level 81, a second processing level 82, a third processing level 83, and a fourth processing level 84.

At processing level 81, a continuous time series (e.g. continuous stream of data) of interaction information, sensor data, and information of the content being created, may be received. For example, the continuous time series may be received and/or monitored at a processor, such as processing module 22. Alternatively, or in addition, continuous time series may be received and/or monitored at a remote system (e.g. a cloud server, a central supervisory system, or the like). The streamed data may relate to at least one of the plurality of users 84 interacting with one or more user devices 14 in relation to one or more parts of a first content creation task in order to create one or more parts of the first content 16. The streamed data may mathematically form an infinite stream.

At the processing level 82, the streamed data may be separated into a plurality of segments, such as segments 82a and 82b. The plurality of segments of data may be processed sequentially or in parallel. The segmentation of data may be performed based on data from each user. For example, segment 82a may correspond to interaction information and user state data of a first user, and segment 82b may correspond to interaction information and user state data of a second user. Alternatively, or in addition, the segmentation may be performed based on time, physical state, psychological state, symptomatic state, or any other criteria defined by a user or a default criteria.

At processing level 83, a plurality of data is determined for one or more of the plurality of users at one or more time instances. The plurality of determined data may comprise at least one of content creation performance data and user state data, as computed from one or more models, such as the first model.

At processing level 84, the plurality of determined data may be analysed and processed. The processing of the determined data may comprise monitoring the data and determining a collective workload, or collective content creation performance data for the plurality of users at cognition measures 84a, 84b, and 84d (at different time instances respectively). Alternatively, or in addition, the processing of the determined data may comprise performing one or more user state tests, for example at state check 84c. The user state tests are explained in further detail with reference to FIGS. 13 and 14.

In an example embodiment, the streamed data received at the processing level 81 may be used for determining connectional data among a plurality of users. The connectional data may be used for a connectional dimension of the workload model described above. The connectional data may represent measurements relating to collaboration between a user and one or more other users and/or collaboration between the user and one or more devices or tools. For example, a team composition or connection may affect the performance of the users in the team depending on one or more of personality, interests, and skills of the users forming the team. Connectional data for collaboration between one or more users may represent such connections between users of the team. In another example, connectional data for collaboration between users and one or more devices or tools may represent how the user uses the device or tools, including usage skills, efficiency of using one or more devices or tools compared to other devices or tools for the same tasks, or the like.

In an example embodiment, the processing corresponding to the processing levels 81, 82, 83, and 84 may be performed at the processing module 22, or may be performed at a remote server or supervisory system.

Figure 9:
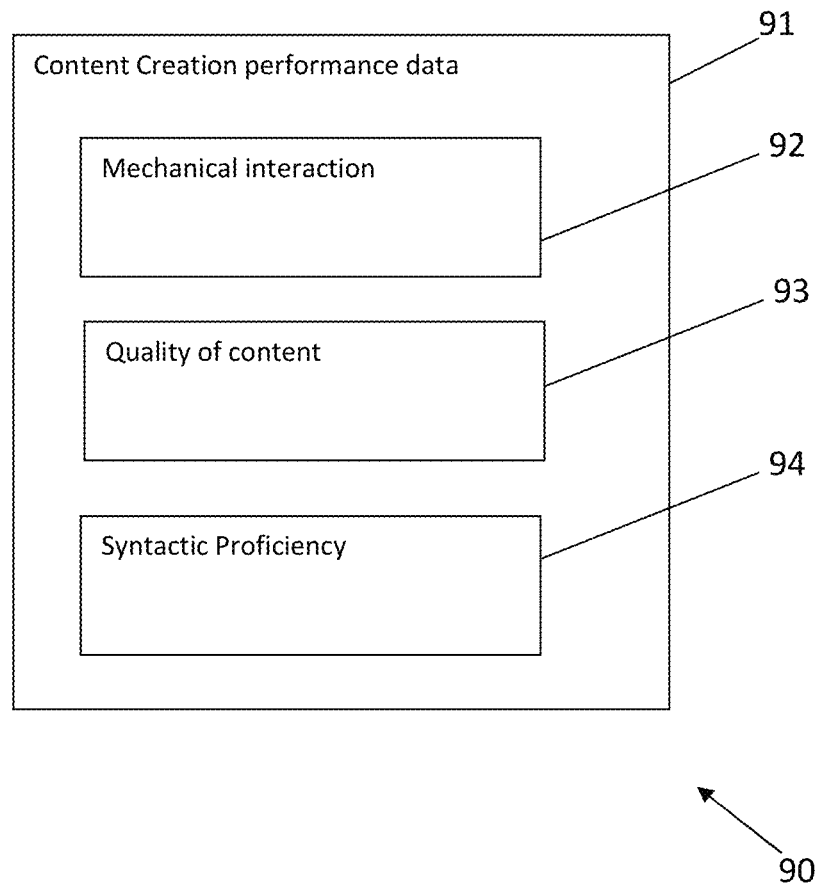

FIG. 9 is a block diagram, indicated generally by the reference numeral 90, in accordance with an example embodiment. System 90 illustrates a plurality of components related to content creation performance data 91. As discussed above with reference to FIG. 4, the first model 42 may provide, as an output, content creation performance data and user state data. The content creation performance data 91 may be determined, based at least partially, on mechanical interaction 92 of the at least one user (such as user 12) with the at least one user device (such as user devices 14), quality 93 (e.g. cognitive proficiency of topics, coherence, speed, linearity of transitions, etc.) of one or more parts of the first content (such as the first content 16), or syntactic proficiency 94 (such as error rate of one or more error types, number of edits, erasures, changes, redundancy as letters or part of speech units) of one or more parts of the first content when the at least one user performs the first content creation task.

In an example embodiment, the mechanical interaction 92 may include dynamics of each item of the first content (e.g., keystroke dynamics for entering one letter). The mechanical interaction 92 may at least partially be determined based on the interaction information received via the user devices 14. For example, the mechanical interaction 92 may be based on keylogging or keyboard capturing (e.g. recording/logging the keys pressed on a keyboard using keyloggers), such that any typing action may be monitored. Typing actions that are recorded may include information regarding which keys are pressed, pressure with which keys are pressed, speed with which typing is performed, timestamp of pressing each key, or the like. The typing actions may be recorded using either software or hardware tools. The keyloggers may provide, as an output, a set of concurrent streaming time series where each key becomes a data stream generating a set of concurrent streaming time series characterizing one key. The mechanical interaction 92 may be based on the output from one or more keyloggers or one or more other user devices (e.g. mouse, touch pad, etc.), such that the mechanical interaction 92 may comprise one or more patterns of mechanical interaction of one or more users with one or more user devices. As such, the patterns may provide information regarding behaviours of one or more users regarding interaction with one or more user devices for creation of content.

In an example embodiment, the quality of content 93 may relate to various factors (e.g. cognitive proficiency) that may affect the quality of a created content. For example, when the content is a text content (e.g. a research paper), the quality of the content may at least partially be determined based on the structure of the research paper. For example, content with a linear or tree structure (relatively high content coherence) may be considered to be of high quality, but content with a random structure (relatively low content coherence, e.g. spaghetti structure) may be considered to be of low quality. In one example, content may be considered to be of high quality if a ratio between content coherence and content creation speed is constant, or increasing. The content coherence may be computed by determining one or more units that may provide coherence to the created content, and then segmenting the content based on the determined units. The determination of units and the segmentation may be performed using natural language processing tools for extracting sentences and token level information. The units of importance may be determined as named entity recognitions (NERs). The content coherence may be determined based on how transitions are made in the content creation, where the transitions are determined by using the units of importance as reference points. In another example, the content coherence may depend on how transitions are made between each sentence using one or more local coherence measures.

In an example embodiment, the syntactic proficiency 94 may relate to one or more types of actions (e.g. number of edits, erasures, changes, redundancy as letters or part of speech units) made by the user while creating the content. The content may be segmented into one or more units, and the syntactic proficiency 94 may be determined for at least one of the one or more units. For example, The segmentation into one or more units may be performed based on a letter level (e.g. paragraphs, lines, sentences, etc.) for textual content, symbols or objects for visual content (e.g. painting, 3D model creation, etc.), or the like. The types of actions may relate to one or more errors of one or more error types. For example, the syntactic proficiency 94 may be determined based at least partially on syntactic number of edits, erasures, changes, redundancy at a unit level, number of deviations from a preferred template (if any), or the like. For example, for a textual content, the syntactic proficiency 94 may be calculated based on number of times a letter is erased, a word is modified, words or ideas are redundantly used multiple times, or the like.

Figure 10:
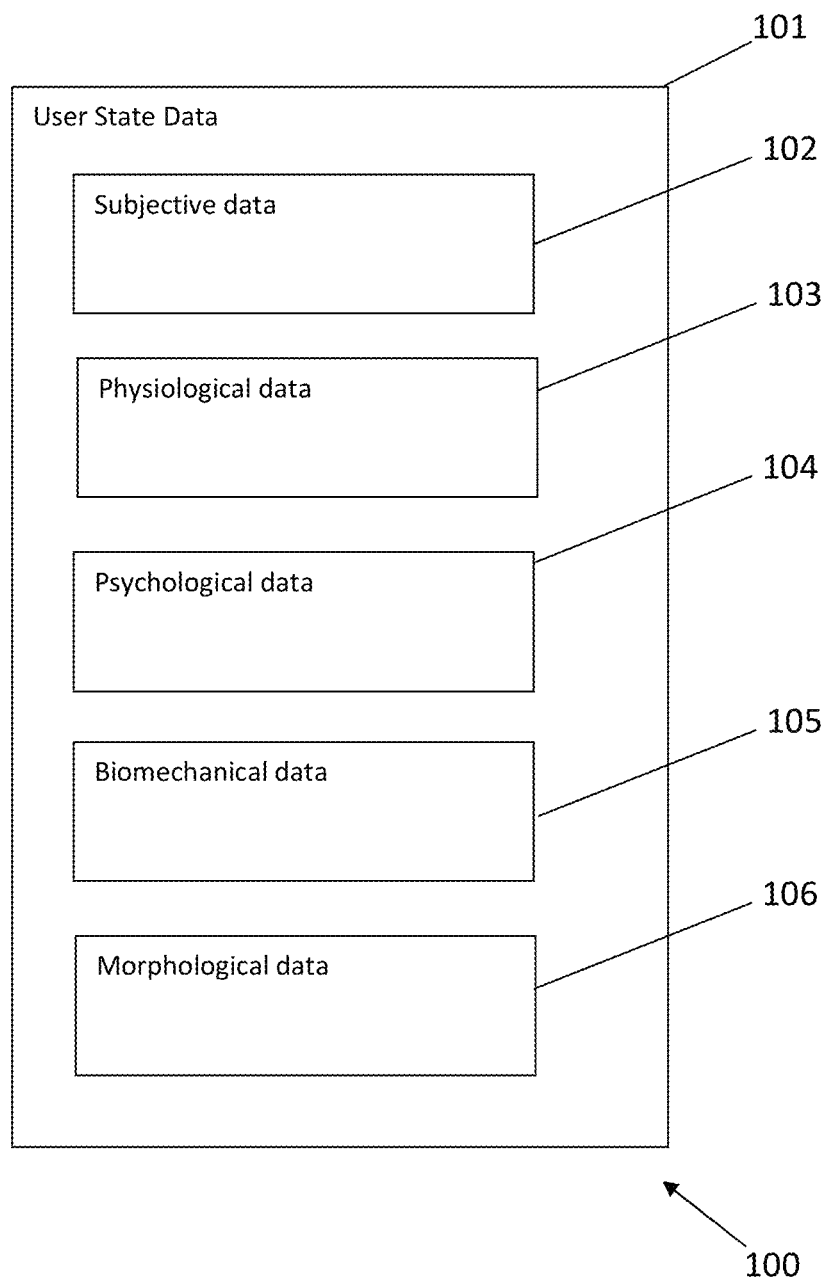

FIG. 10 is a block diagram of a system, indicated generally by the reference numeral 100, in accordance with an example embodiment. System 100 illustrates a plurality of components related to user state data 101. As discussed above with reference to FIG. 4, the first model 42 may provide, as an output, content creation performance data and user state data. The user state data 101 may be determined, based at least partially, on one or more of subjective data 102, physiological data 103, psychological data 104, bio-mechanical data 105, or morphological data 106.

In an example embodiment, subjective data 102 may comprise self-reported data measurements relating to a perception of a user relating to workload, content creation performance, or demands on the user. For example self-reported data measurements may include inputs from the user indicating whether the demands on the user are lower than a threshold, higher than a threshold, or measurements related to health, tiredness, stress, or the like, of the user. The self-reported data measurements may further include inputs from the user indicating whether the user perceives his/her performance to be above or below a threshold, or within an acceptable range. The user may be presented with a means to input the self-reported data. Example measurement scales for self-reported data may include NASA Task Load Index (NASA-TLX), subjective workload assessment technique (SWAT), Subjective workload dominance technique (SWORD), and Modified Cooper-Harper (MCH).

In an example embodiment, physiological data 103 may represent physiological indicators for a user. For example, physiological measurements may include heart rate, cardiac activity, respiratory activity, ocular activity, brain activity, sleep patterns, number of hours of sleep, body temperature, body sweat levels, or the like.

In an example embodiment, psychological data 104 may represent psychological indicators for a user. For example, psychological measurements may include emotional state (for example determined by voice, facial expression patterns, gestures, postures, or the like), personal profile (for example personality data, past medical conditions, etc.), and emotional or physical feeling (for example happy, sad, in pain, etc.). Changes in physiological data may be analysed (for example to quantify metabolic rates or energy) while the user is performing one or more parts of one or more tasks.

In an example embodiment, bio-mechanical data 105 may represent measurements related to posture of a user. Posture measurements of the user may indicate the posture of the user while performing different tasks. The posture measurements may be used for determining a type or degree of muscle and/or skeletal stress on the user. Information of the stresses on one or more muscles or one or more parts of the skeleton may indicate whether the user has been assigned demands higher than a threshold which may be causing physical stress. Posture measurements may be based on self-reported data (for example the user providing inputs regarding muscle pain or joints pain) or data from device(s) measuring posture and/or comparing the posture with ideal posture(s).

In an example embodiment, the morphological data 106 may represent measurements relating to impact of a form, shape or structure of devices used by a user for performing one or more tasks. Both physical and mental tasks may comprise usage of one or more devices or tools. The form, shape, weight, structure, and/or comfort of use of the devices or tools may affect the workload, content creation performance, interaction of the user with one or more devices, or user state of the user. For example, performance of a user performing a content creation task may be affected by the size, shape, appearance, weight, or other physical aspects of one or more user devices (e.g. screen, keyboard, mouse, digital pen, etc.) used for performing the content creation task.

In an example embodiment, the one or more dimensions (described above) of the workload model have equal weights in the workload model, and one or more measurements (described above) for each of the dimensions may also have equal weights. A mathematical formulation for computing the workload using the workload model at a time t1 may be formulated as:

$$WL_{T1} = \sum_{i=1}^{7}\sum_{j=0}^{n_j} \frac{m_j}{n_j}, j, n \in \mathbb{N},$$

where:
$WL_{t1}$ represents workload at time T1;
i iterates over the dimensions;
j iterates over measurements for dimension i;
$m_j$ represents values of the measurement; and
$n_j$ represents number of measurements for dimension i.

In an example embodiment, the one or more dimensions of the workload model may have equal weights in the workload model. One or more measurements for each of the dimensions may have different weights. A mathematical formulation for computing the workload using the workload model at a time t1 may be formulated as:

$$WL_{t1} = \sum_{i=1}^{7}\sum_{j=0}^{n_j} \frac{m_j \times w_{m_j}}{n_j}, j, n \in \mathbb{N},$$

where:
$WL_{t1}$ represents workload at time T1;
i iterates over the dimensions;
j iterates over the measurements for dimension i;
$m_j$ represents the values of the measurements;
$n_j$ represents number of measurements for dimension i; and
$w_{m_j} \in \mathbb{R}$ represents a weight for measurement $m_j$.

In an example embodiment, one or more dimensions may have different weights, and measurements of the one or more dimensions may have different weights. The workload may be computed by integrating weights of the one or more dimensions and measurements based on interactional relations among the dimensions. A mathematical formulation for computing the workload using the workload model at a time t1 may be formulated as:

$$WL_{t1} = \sum_{i=1}^{7} \sum_{j=0, k \in 1...7}^{n_j} \frac{m_j \times w_{m_j}|k}{n_j}, j, n \in \mathbb{N},$$

where:

$WL_{t1}$ represents workload at time T1;

i iterates over the dimensions;

j iterates over the measurements for dimension i;

$m_j$ represents the values of the measurements;

$n_j$ represents number of measurements for dimension i; and $w_{m_j} \in \mathbb{R}$ represents a weight for measurement $m_j$;

rel(i, j), i, j $\in$ 1 . . . 7 represents interactional relations among the dimensions; and k represents an index of interactional relation with j.

Figure 11:
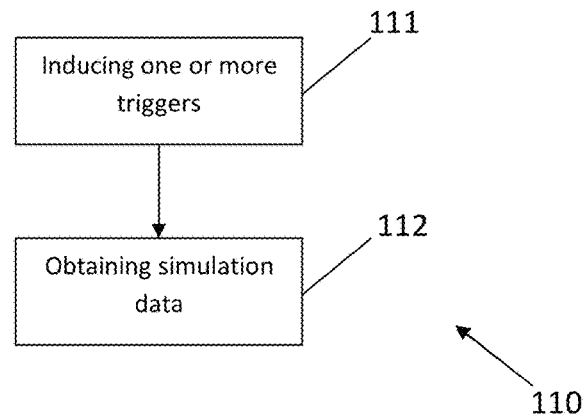
FIG. 11 is a flow chart of an algorithm in accordance with an example embodiment.

FIG. 11 is a flowchart of an algorithm, indicated generally by the reference numeral 110, in accordance with an example embodiment. The historical performance data described above with reference to FIG. 6 may comprise simulation data. The algorithm 110 relates to a method for obtaining simulation data. At operation 111, one or more triggers are induced to a user, such as user 12. At operation 112, simulation data is obtained. The simulation data may relate to one or more changes in content creation performance or user state of the user, which changes occur in response to one or more of the induced triggers.

In an example embodiment, the simulation data may represent measurements related to prediction of a user's content creation performance and/or user state. One or more simulation models may be used for predicting the content creation performance and/or user state based on historical data (for example the user's content creation performance and/or user state for previous similar tasks). For example, a simulation model may be created based on information relating to one or more aspects of one or more users performing a task, including the one or more users using or interacting with one or more user devices, timeline of the one or more users performing a task, or any other aspect assisting in modelling one or more users' performance of a task. The information may be arranged according to tasks performed by the one or more users. Based on the information, simulation models may model the one or more users, sequence of tasks, and demands on the one or more users while performing one or more respective parts of the one or more respective tasks. The simulation models may then be used for content creation performance predictions, user state predictions, and/or workload predictions for each user.

In an example embodiment, the simulation data may be obtained based on at least one of a historical performance data (e.g. data relating to the one or more users' past performance) and data relating to triggers induced for one or more users.

Figure 12:
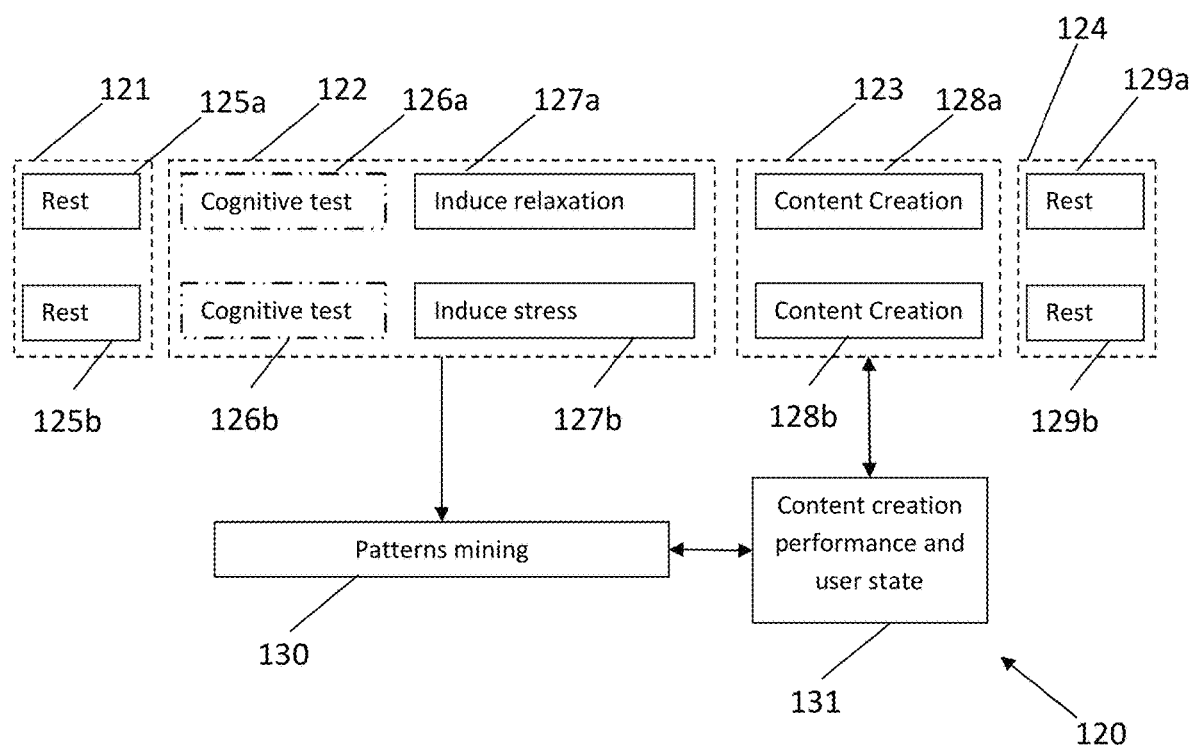
FIG. 12 is a block diagram of a system in accordance with an example embodiment.

FIG. 12 is a block diagram of a system, indicated generally by the reference numeral 120, in accordance with an example embodiment. The system 120 may be an example of how a trigger may be induced in order to obtain simulation data. A first stage 121 relates to a resting stage (e.g. a baseline or initial stage used as a starting point for the simulation); a second stage 122 relates to a trigger inducing stage; a third stage 123 relates to a content creation stage; and a fourth stage 124 relates to a resting stage (e.g. for recovery such that the user may revert back to a default state). A plurality of simulation data may be obtained during the second stage 122 and the third stage 123. The plurality of data may be processed (e.g. determining patterns, determining evolution of data, etc.) at a patterns mining module 130, and the content creation performance data and user state data may be determined at the module 131. The induced triggers may comprise inducing relaxation or inducing stress.

For example, for inducing relaxation, at the first stage 121, a user, such as user 12 is in a rest phase 125a (e.g. no stimuli is applied to the user 12). At the second stage 122, the user 12 may optionally be provided with one or more cognitive tests 126a (further details provided with reference to FIGS. 13 and 14), such that the cognitive state of the user (such as performance, efficiency, stress level, boredom level, cognitive effort, visual activity level, etc.) may be determined. A relaxation trigger 127a may then be induced to the user 12 (for example, by providing a relaxing video, audio, images, or any other trigger that may allow the user to feel relaxed). When the user 12 is in a relaxed state, the user 12 performs one or more parts of a content creation task 128a at the third stage 123. The user 12 may then again revert to a rest phase 129a. When the relaxation trigger 127a is induced to the user 12, a plurality of sensor data may be obtained from the user and then processed by the patterns mining module 130. When the user is performing the content creation task 128a, content creation performance data and user state data may be determined at the module 131 based, at least partially on interaction information received via one or more user devices used by the user 12 to create content, sensor data received from one or more sensors, and the content being created by the user. The sensor data related to the relaxation trigger and the determined content creation performance data and user state data may be used for obtaining the simulation data. The simulation data may comprise a correlation between the relaxed state of the user and the content performance and user state.

In another example, for inducing stress, at the first stage 121, the user is in a rest phase 125b. At the second stage 122 the user 12 may optionally be provided with one or more cognitive tests 126b (further details provided with reference to FIGS. 13 and 14), such that the cognitive state of a user (such as stress level, boredom level, cognitive effort, visual activity level, etc.) may be determined. A stress trigger 127a may then be induced to the user 12. For example, the stress trigger 127a may comprise one or more of N-back number recall, time pressure, reading aloud, viewing stressful or disturbing images or videos, providing lengthy content, a multi-tasking exercise (such as Stroop tasks, timing tasks, question-based tasks, coding tasks, mental arithmetic tasks, etc.). When the user 12 is in a stressed state, the user 12 performs a one or more parts of a content creation task 128b at the third stage 123. The user 12 may then again revert to a rest phase 129b. When the stress trigger 127b is induced to the user 12, a plurality of sensor data may be obtained from the user and then processed by the patterns mining module 130. When the user is performing the content creation task 128b, content creation performance data and user state data may be determined at the module 131 based, at least partially on interaction information received via one or more user devices used by the user 12 to create content, sensor data received from one or more sensors, and the content being created by the user.

In an example embodiment, the patterns mining module uses the content creation performance data corresponding to the relaxation trigger and the stress trigger in order to obtain simulation data corresponding to the user's relaxed state and stressed state respectively. The simulation data may then be used for training one or more simulation models relating to the user's relaxed state and stressed state.

In one example embodiment, a content creation task may be categorized into at least two categories including a low cognitive requirement category and a high cognitive requirement category.

In an example embodiment, the cognitive state of a user (e.g. as determined using the cognitive tests 126 at the second stage 122) may be expressed as a low cognitive state or a high cognitive state. For example, a low cognitive state may indicate that the user may not have a good performance (e.g. efficiency or quality lower than a threshold) in ongoing tasks or future tasks, and a high cognitive state may indicate that the user may have a good performance (e.g. efficiency or quality higher than a threshold) in ongoing tasks or future tasks. In one example embodiment, the cognitive state of a user may be expressed as a score over a range of cognitive states (e.g. a score in a scale of 0 to 10, where 0 may represent lowest cognitive state, and 10 may represent highest cognitive state, or vice versa).

For example, a first user and a second user are required to write a research proposal (e.g. the first content 16) which is required to be submitted before a temporal deadline. The research proposal may have a template with a plurality of sections, where each section may have different cognitive requirements. For example, the sections including bibliographic information, administrative information, or the like, may be categorized in the low cognitive requirement category (as these sections do not require high attention or skill level). The sections requiring information on the research proposal, innovative aspects presentations, advantages estimations of the proposal, or the like, may be categorized in the high cognitive requirement category.

The first user and the second user may wear one or more wearables comprising one or more sensors, or may be connected to one or more non-wearable devices containing one or more sensors. Sensor data relating to the first user and the second user may be received from the one or more sensors.

The first user and the second user may use one or more user devices for preparing the research proposal. For example, the first and second users may type on a keyboard of a computer (laptop, desktop, or the like). Interaction information relating to the first and second users using the one or more user devices may be obtained, for example, from one or more key logger programs running on each computer being used and is storing information regarding each typed key along with details of typing (e.g. pressure on the keys, time when the keys were pressed, time when the keys were released, etc.).

The first model 42 (running at a processing module comprised within one of the computers used by the first and second users, or comprised in an external remote server) may be used for determining cognitive states (e.g. based on the cognition measures 74a, 74b, 74d, 84a, 84b, or 84d with reference to FIGS. 7 and 8) of the first and second users, including the content creation performance and user state of the first and second users. As the cognitive states are determined, one or more parts (e.g. remaining parts) of the content creation task (research proposal) may be assigned to the first user and second user based on the determined cognitive state and based on remaining sections of the research proposal that are required to be finished before the deadline. The parts may be assigned such that the demands on the first user and second user are balanced (e.g. according to difficulty of task, length of task, and skills of the users), the performance of at least one of the first user and second user is optimized, and the cognitive wellbeing (e.g. relaxed, less stressed) of the users are considered. For example, if the first user has a high expertise (e.g. a PhD holder) in the topic of the research proposal, and the second user has low expertise (e.g. an undergraduate student), the first user may have better performance in the high cognitive need category, and the second user may have better performance in the low cognitive need category. As such the sections of the research proposal may be assigned to the first user and the second user accordingly.

In an example embodiment, in order to compute the cognitive states (e.g. based on cognition measures 74a, 74b, 74d, 84a, 84b, or 84d with reference to FIGS. 7 and 8) of the first and second user, a continuous time series (e.g. continuous stream of data) of interaction information, sensor data, and information of the content being created, may be received and/or monitored (e.g. at a processor or a remote server). The streamed data may mathematically form an infinite stream. The streamed data may relate to the first user and/or the second user interacting with one or more user devices in order to create one or more parts of the research proposal. The streamed data may be segmented based on a fixed time (e.g. segmentation is performed for each 30 minutes of data received), or based on symptomatic state of the users (e.g. happy, sad, fearful, angry, surprised, physical pain, cold, hot, positivity, relaxation, engagement, dizziness, extraversion, awakeness, socialness, fitness, empathy, or any other state that a user may feel etc.).

The content creation performance data may be determined based on one or more of mechanical interaction of the users with the user devices (e.g. keylogging), quality of content (e.g. how many times names or entities are referenced in the text without an appropriate introduction), and syntactic proficiency (e.g. errors, number of edits, erasures, typographical errors, etc.).

The user state data may be determined based on subjective or self-reported data (e.g. using the NASA-TLX form for each user), physiological and psychological data (e.g. by detecting stressed or non-stressed states by analysing heart rate and breathing values, or by detecting visual strain), biomechanical data (e.g. by computing a score for discomfort, for example by determining number of moves on a chair as an indicator of discomfort), morphological data (e.g. indicated by the user, or measured using a similarity between the computer used for the task and a personal computer used by the user for daily activities).

The cognitive state of the first and second user may further be based on historical performance data. The historical performance data may be based, for example, on expertise level (e.g. number of years of experience in the field of the content creation task, such as experience in academic activities and number of past research proposal writings), and on a simulation model (e.g. if the user participated previously in similar content creation task with a deadline while the user's cognitive state was being monitored).

In an example embodiment, the cognitive states of the first and second users may be derived by determining cognition measures (e.g. cognition measures determined at processing levels 74 and 84 with reference to FIGS. 7 and 8), where the cognition measures may be determined by aggregating content creation performance data, user state data, and historical performance data, as discussed in further detail below.

In an example embodiment, the cognitive state of a user at time instant t1 may be formulated as:

$$CS_{t1} = \left(\sum_{i=1}^{7}\sum_{j=0}^{n_j}\frac{m_j}{j}\right)/3,$$

where:
$CS_{t1}$ represents the cognitive state;
i iterates over the dimensions;
j iterates over measurements for dimension i;
$m_j$ represents values of the measurement; and
$n_j$ represents number of measurements for dimension i.

For the above example of the research proposal, the cognitive state of each user may be formulated as:

$$CS_{t1} = \left(\frac{cd + cp + sp}{3} + \frac{nasa - tlx + b + m}{3} + \frac{e + s}{2}\right)/3,$$

where:
$CS_{t1}$ represents the cognitive state;
cd represents measurement values for mechanical interaction;
cp represents measurement values for quality of content;
sp represents measurement values for syntactic proficiency;
nasa-tlx represents measurement values for subjective data;
b represents measurement values for biomechanical data;
m represents measurement values for morphological data;
e represents measurement values for expertise level; and
s represents measurement values for simulation data.

In the above example, $$\frac{cd + cp + sp}{3}$$

may relate to content creation performance data, $$\frac{nasa - tlx + b + m}{3}$$

may relate to user state data, and $$\frac{e + s}{2}$$

may relate to historical performance data.

In one example, for each of the users, the cognitive state may be transformed into binary values of either low cognitive state or high cognitive state. The transformation into the two values may be performed either dynamically by detection of a sharp change in the values pattern (e.g., elbow method on time series), or by applying a wavelet transform based on the difference between current cognitive state and historical cognitive state.

Figure 13:
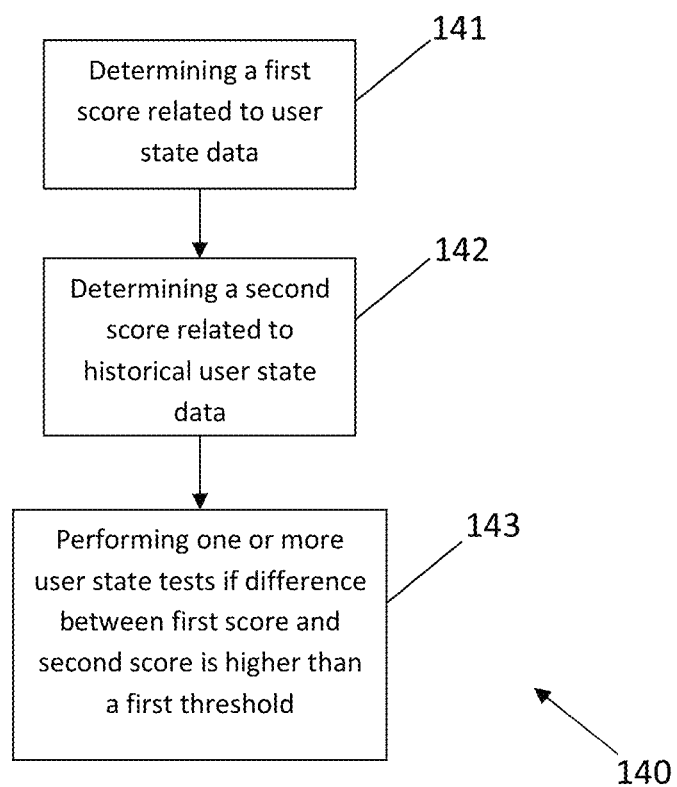
FIG. 13 is a flow chart of an algorithm in accordance with an example embodiment.

FIG. 13 is a flowchart of an algorithm, indicated generally by the reference numeral 140, in accordance with an example embodiment. At operation 141, a first score is determined relating to user state data. For example, the first score may be related to a current user state (e.g. determined when the user uses one or more user devices to perform a content creation task with reference to FIG. 4). At operation 142, a second score is determined relating to historical user state data. For example, the second score may be related to the historical user state data (as determined for the historical performance data with reference to FIG. 6). If a difference between the first score and the second score is more than a first threshold, one or more user state tests may be performed at operation 143. For example, the historical user state data may comprise information about the user's normal state (e.g. physical state, psychological state, etc.) based on an aggregation of the historical data related to the user. If there is a significant difference between the first score and the second score such that the difference is higher than the first threshold, it may be determined that the user may not be in a normal state (e.g. more tired or stressed than usual, more distracted than usual, etc.). In order to determine one or more reasons (such as high amount of demands, difficulty in using or interacting with one or more devices, high difficulty of the task compared to the user's cognitive abilities, etc.) for the user not being in a normal state, or in order to determine one or more actions to improve the cognitive state or user's performance for the task, one or more state tests may be performed. The user state tests may comprise one or more of inducing one or more relaxation or stress triggers, providing one or more questionnaires to the user or monitoring visual activity of the user while reading or editing content.

Figure 14:
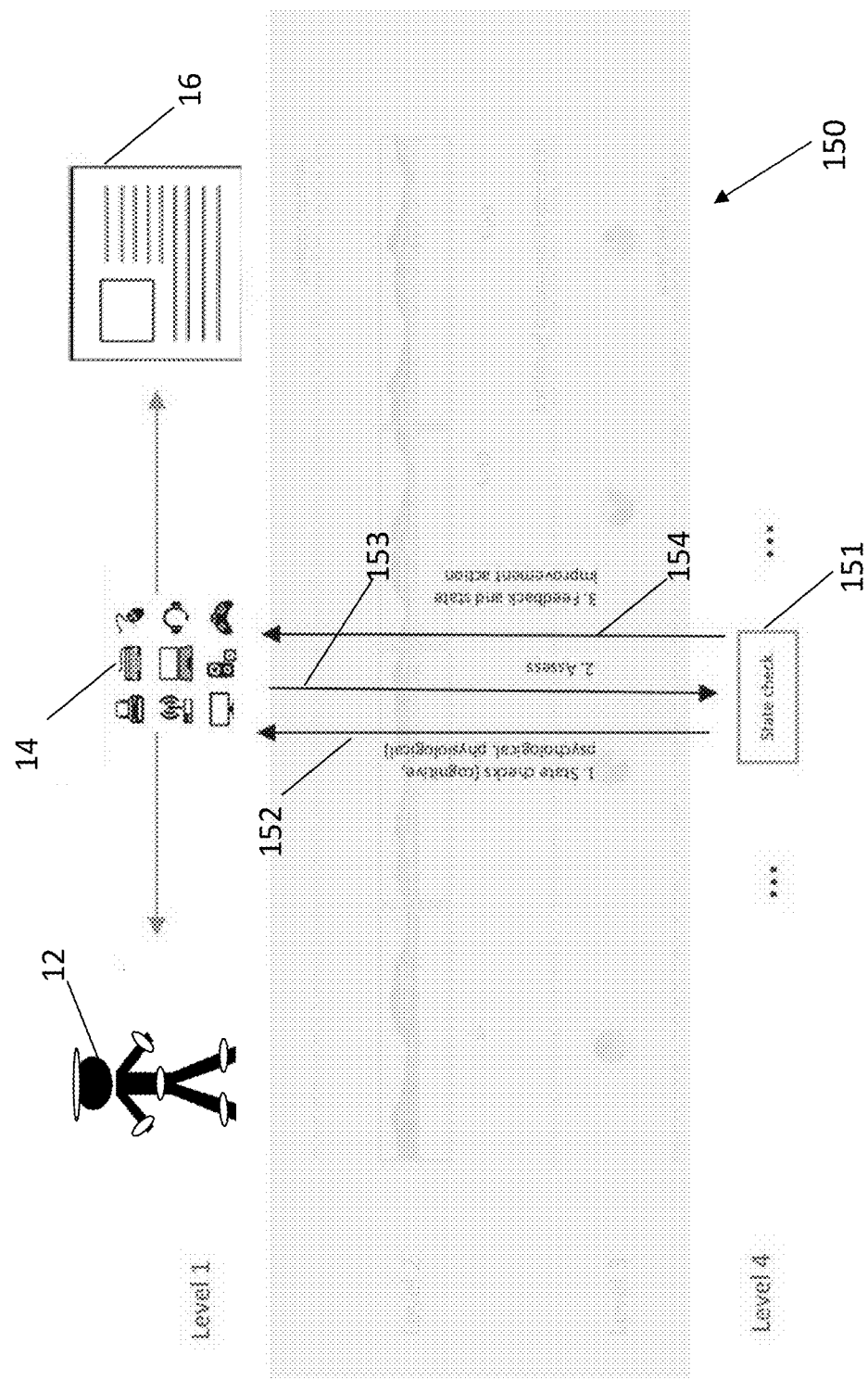
FIG. 14 is a block diagram of a system in accordance with an example embodiment.

FIG. 14 is a block diagram of a system, indicated generally by the reference numeral 150, in accordance with an example embodiment. The user 12 may interact with one or more user devices 14 for performing a first content creation task in order to create the first content 16. One or more user state tests may be performed at state check 151. With reference to FIG. 7, the state check 151 may be similar to the state check 74c as performed at processing level 74 for analysing and/or processing a plurality of determined data received from one or more user devices 14 and/or one or more sensors 24, one or more of which may be worn by the user 12, as shown in FIG. 14. At operation 152, one or more user state tests are provided to the user. For example, the user state tests may be provided via the one or more user devices 14 that are being used by the user 12. At operation 153, one or more responses of the user 12 received in response to the user state tests may be assessed. At operation 154, one or more suggestions, feedbacks, or state improvement actions may be provided based on the response of the user 12. For example, the user state test may comprise a cognitive test, such as a multi-tasking exercise (such as Stroop tasks, timing tasks, question-based tasks, coding tasks, mental arithmetic tasks, etc.), or may comprise a visual activity test (for example, whether the user notices multiple visual aspects or visual changes on the screen). For example, if the visual activity indicates that the movements of the user's eyes are deviating from expected movements, the feedback provided at operation 154 may inform the user that the user may be experiencing eye muscle fatigue or eye strain. One or more state improvement actions, such as eye exercises, may be suggested to the user, or one or more elements related to the eye exercises may be provided on a screen of the one or more user devices 14 in order to allow the user to perform the eye exercises while looking at the screen.

In an example embodiment, the first model (e.g. the first model 42) used for determining the content creation performance data and the user state data comprises a machine learning model, for example, a neural network. FIG. 15 shows a neural network, indicated generally by the reference numeral 160, used in some example embodiments. For example, the first model 42 may comprise the neural network 160. The neural network 160 may be trained with simulation data, as obtained in algorithm 110 with reference to FIGS. 11 and 12. The neural network 160 comprises an input layer 161, one or more hidden layers 162, and an output layer 163. At the input layer 161, interaction information, sensor data, and content data may be received as inputs. The interaction information may relate to at least one user using at least one user device in relation to one or more content creation tasks, the sensor data may relate to the at least one user (e.g. from one or more sensors attached to the user or the user device), and the content may be a content created during the first content creation task. The hidden layers 162 may comprise a plurality of hidden nodes, where the cognitive analytics (e.g. machine learning modelling for cognitive analysis) are performed corresponding to the data received. At the output layer 163, content creation performance data and user state data are provided as outputs.

Figure 16:
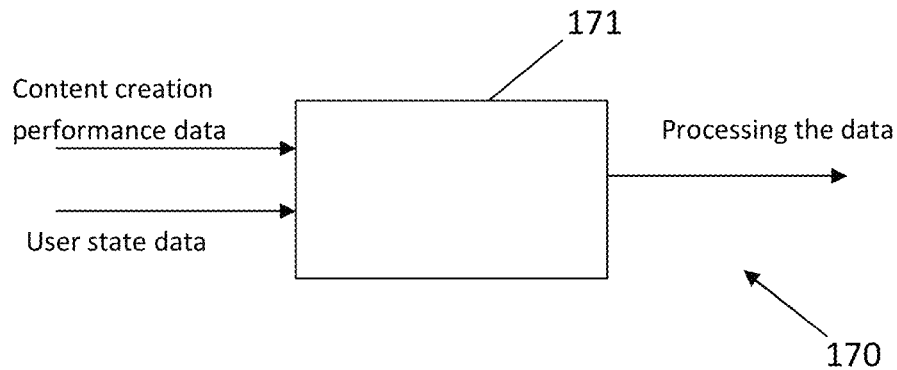
FIG. 16 is a block diagram of a system in accordance with an example embodiment.
Figure 17:
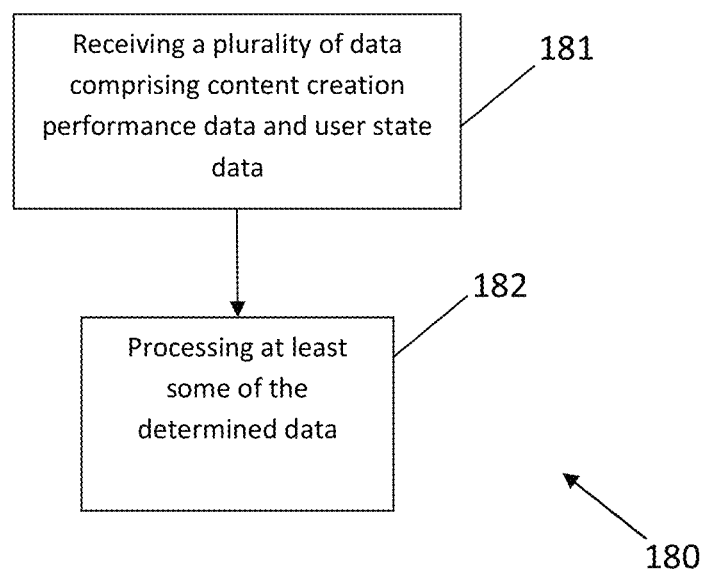
FIG. 17 is a flow chart of an algorithm in accordance with an example embodiment.

FIG. 16 is a block diagram of a system, indicated generally by the reference numeral 170, in accordance with an example embodiment. FIG. 16 is viewed in conjunction with FIG. 17 for better understanding of the example embodiments. FIG. 17 is a flowchart of an algorithm, indicated generally by the reference numeral 180, in accordance with an example embodiment.

At operation 181, a processing module 171 receives as inputs a plurality of determined data, including content creation performance data and user state data, as determined in the above example embodiments. At operation 182, the processing module 171 then processes at least some of the determined data.

In one example, the processing module 171 comprises a workload model (as described above with reference to FIG. 4) for processing the received data. The workload model may receive as inputs the content creation performance data (relating to a performance dimension of the workload model) and the user state data (relating to one or more of a subjective, physiological, psychological, biomechanical, and morphological dimensions of the workload model). The workload model may provide, as an output, the workload of the at least one user. The workload of the at least one user may be based, at least partially, on the content creation performance data and the user state data.

Figure 18:
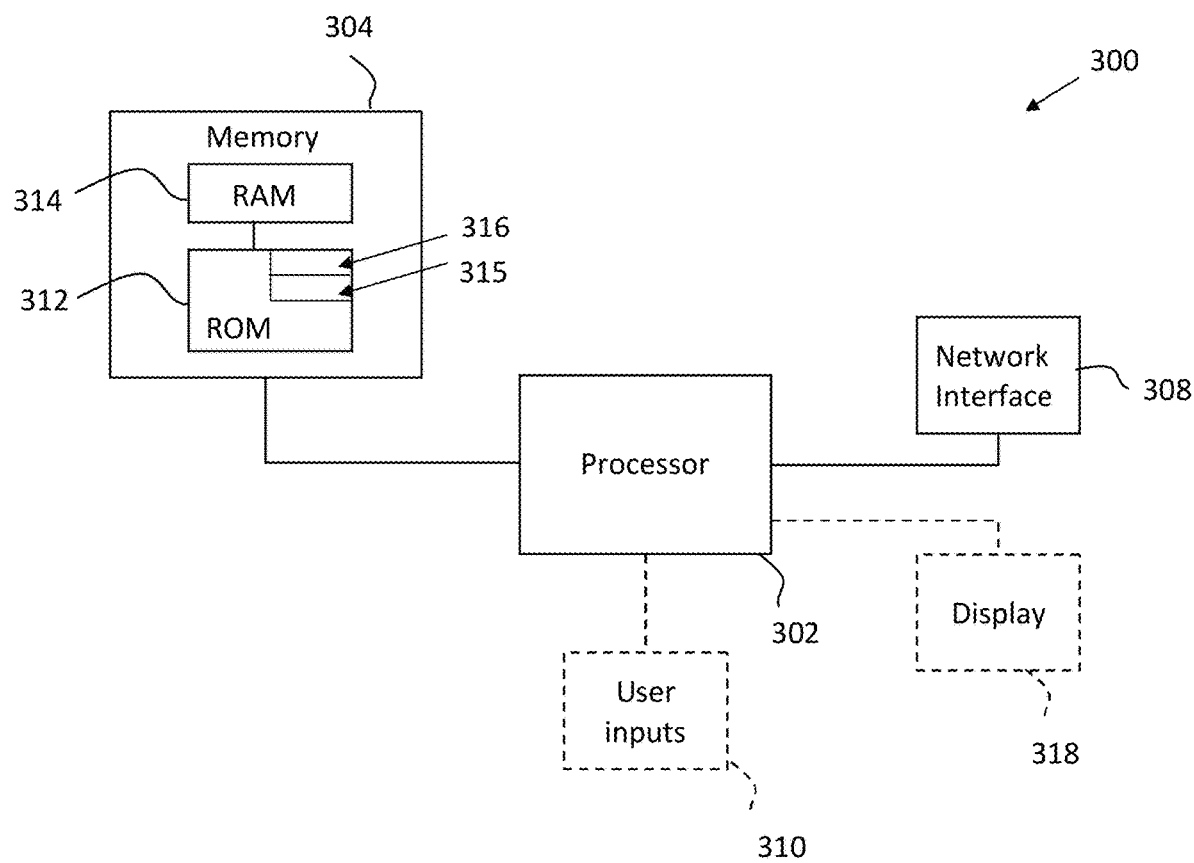
FIG. 18 is a schematic diagram of components of one or more of the example embodiments.

For completeness, FIG. 18 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 50, 110, 140, and 180, described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 19A:
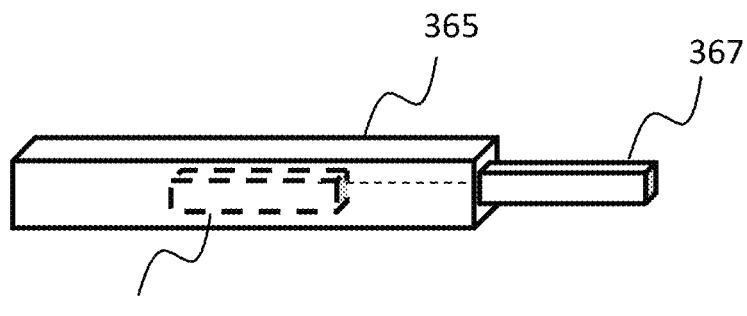
FIGS. 19A and 19B show tangible media, respectively a removable non-volatile memory unit and a compact disc (CD) storing computer-readable code which when run by a computer perform operations according to embodiments.
Figure 19B:
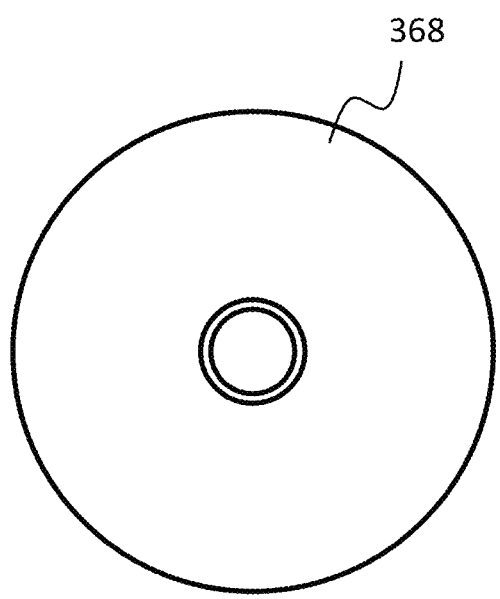

FIGS. 19A and 19B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 3, 5, 11, 13, and 17 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and
   at least one memory including computer program code,
   the at least one memory and the computer program code configured to, with the at least one processor, cause the apparatus at least to perform:
   receiving interaction information via at least one user device, wherein the interaction information is related to at least one user using the at least one user device in relation to a first content creation task;
   receiving sensor data relating to the at least one user from one or more sensors; and
   determining data, using a first model, the data comprising content creation performance data and user state data, wherein:
   the content creation performance data indicates performance of the at least one user in relation to the first content creation task according to the interaction information related to the at least one user using the at least one user device, based, at least in part, on a first content created when the at least one user performs the first content creation task; and
   the user state data is based, at least in part, on the received sensor data relating to the at least one user in relation to the first content creation task; and
   causing a change to one or more factors related to the first content creation task based, at least in part, on at least some of said determined data, wherein the one or more factors comprises a demand on the at least one user.

2. An apparatus as claimed in claim 1, wherein the at least one memory and the computer program code are further configured to, with the at least one processor, cause the apparatus to monitor at least some of said determined data by comparing at least one of the content creation performance data and user state data of the at least one user with at least one of the content creation performance data and user state data of at least one other user.

3. An apparatus as claimed in claim 1, wherein the at least one memory and the computer program code are further configured to, with the at least one processor, cause the apparatus to monitor at least some of said determined data by comparing at least one of the content creation performance data and user state data of the at least one user at a first time instance with at least one of the content creation performance data and user state data of the at least one user at a second time instance.

4. An apparatus as claimed in claim 1, wherein the content creation tasks relate to a collaboration comprising a plurality of parts performed by a plurality of users, and wherein the at least one memory and the computer program code are configured to, with the at least one processor, cause the apparatus at least to further perform at least one of:
   adding one or more additional parts of one or more content creation tasks assigned to the at least one user; or
   removing one or more parts of one or more content creation tasks assigned to the at least one user.

5. An apparatus as claimed in claim 1, wherein said determined data further comprises historical performance data, wherein the historical performance data is based, at least in part on, one or more of historical content creation performance data, or corresponding historical user state data.

6. An apparatus as claimed in claim 5, wherein the historical performance data comprises simulation data, wherein the simulation data is obtained by inducing one or more triggers to the at least one user.

7. An apparatus as claimed in claim 5, wherein the at least one memory and the computer program code are configured to, with the at least one processor, cause the apparatus at least to further perform:
   determining a first score related to the user state data and a second score related to the historical user state data; and
   performing one or more user state tests if a difference between the first score and the second score is higher than a first threshold.

8. An apparatus as claimed in claim 1, wherein the content creation performance data is determined based on information relating to one or more of mechanical interaction of the at least one user with the at least one user device, quality of one or more parts of the first content, or syntactic proficiency of one or more parts of the first content when the at least one user performs the first content creation task.

9. An apparatus as claimed in claim 1, wherein the user state data is based, at least in part, on one or more of subjective data, physiological data, psychological data, biomechanical data, or morphological data.

10. An apparatus as claimed in claim 1, wherein the at least one memory and the computer program code are configured to, with the at least one processor, cause the apparatus at least to further perform: training the first model.

11. A method comprising:
    receiving interaction information via at least one user device, wherein the interaction information is related to at least one user using at least one user device in relation to a first content creation task;
    receiving sensor data relating to the at least one user from one or more sensors;
    determining data, using a first model, the data comprising content creation performance data and user state data, wherein:
    the content creation performance data indicates performance of the at least one user in relation to the first content creation task according to the interaction information related to the at least one user using the at least one user device, based, at least in part, on a first content created when the at least one user performs the first content creation task; and the user state data is based, at least in part, on the received sensor data relating to the at least one user in relation to the first content creation task; and causing a change to one or more factors related to the first content creation task based, at least in part, on at least some of said determined data, wherein the one or more factors comprises a demand on the at least one user.

12. A non-transitory computer readable medium comprising program instructions for causing an apparatus to perform at least the following:

receiving interaction information via at least one user device, wherein the interaction information is related to at least one user using the at least one user device in relation to a first content creation task;

receiving sensor data relating to the at least one user from one or more sensors;

determining data, using a first model, the data comprising content creation performance data and user state data, wherein:

the content creation performance data indicates performance of the at least one user in relation to the first content creation task according to the interaction information related to the at least one user using the at least one user device, based, at least in part, on a first content created when the at least one user performs the first content creation task; and the user state data is based, at least in part, on the received sensor data relating to the at least one user in relation to the first content creation task; and causing a change to one or more factors related to the first content creation task based, at least in part, on at least some of said determined data, wherein the one or more factors comprises a demand on the at least one user.

13. The non-transitory computer readable medium of claim 12, wherein the non-transitory computer readable medium further comprises program instructions to monitor at least some of said determined data by comparing at least one of the content creation performance data and user state data of the at least one user with at least one of the content creation performance data and user state data of at least one other user.

14. The non-transitory computer readable medium of claim 12, wherein said determined data further comprises historical performance data, wherein the historical performance data is based, at least in part on, one or more of historical content creation performance data, or corresponding historical user state data.

15. The non-transitory computer readable medium of claim 14, wherein the historical performance data comprises simulation data, wherein the simulation data is obtained by inducing one or more triggers to the at least one user.

16. The apparatus according to claim 1, wherein the at least one memory and the computer program code are further configured to, with the at least one processor, cause the apparatus at least to:

model a workload of the at least one user based on the content creation performance data and the user state data.

17. An apparatus as claimed in claim 1, wherein the at least one memory and the computer program code are further configured to, with the at least one processor, cause the apparatus at least to further perform: causing a change to one or more factors related to the first content creation task based, at least in part, on at least some of said determined data, wherein the one or more factors comprises the at least one user device.

18. An apparatus as claimed in claim 1, wherein the at least one memory and the computer program code are further configured to, with the at least one processor, cause the apparatus at least to further perform: causing a change to one or more factors related to the first content creation task based, at least in part, on at least some of said determined data, wherein the one or more factors comprises one or more settings of the at least one user device.

19. An apparatus as claimed in claim 1, wherein the at least one memory and the computer program code are further configured to, with the at least one processor, cause the apparatus at least to further perform: causing a change to one or more factors related to the first content creation task based, at least in part, on at least some of said determined data, wherein the one or more factors comprises cognitive resources.

* * * * *

UNITED STATES PATENT AND TRADEMARK OFFICE
CERTIFICATE OF CORRECTION

| | |
|---|---|
| PATENT NO. | : 11,593,727 B2 |
| APPLICATION NO. | : 17/020030 |
| DATED | : February 28, 2023 |
| INVENTOR(S) | : Alessandra Sala et al. |

It is certified that error appears in the above-identified patent and that said Letters Patent is hereby corrected as shown below:

In the Claims

In Column 25, Line 36, Claim 1, delete "sensors; and" and insert -- sensors; --, therefor.

Signed and Sealed this
Twenty-seventh Day of June, 2023

Katherine Kelly Vidal
*Director of the United States Patent and Trademark Office*